(12) United States Patent
Quenzi et al.

(10) Patent No.: US 7,950,675 B1
(45) Date of Patent: May 31, 2011

(54) CARGO CARRIER

(75) Inventors: Philip J Quenzi, Atlantic Mine, MI (US); Richard W Jenney, Naples, FL (US)

(73) Assignee: Absolute Electronic Solutions, Inc., Las Vegas, NV (US)

( * ) Notice: Subject to any disclaimer, the term of this patent is extended or adjusted under 35 U.S.C. 154(b) by 880 days.

(21) Appl. No.: 11/432,851

(22) Filed: May 12, 2006

Related U.S. Application Data

(60) Provisional application No. 60/680,559, filed on May 13, 2005.

(51) Int. Cl.
 *B60P 1/00* (2006.01)
 *B60G 17/00* (2006.01)
(52) U.S. Cl. ........... 280/6.157; 280/6.156; 280/124.128; 180/209; 414/480
(58) Field of Classification Search ............... 280/5.514, 280/6.15, 6.151, 6.156, 6.157, 43.17, 43.23, 280/124.128, 124.157, 124.16, 124.161, 280/86.5; 180/22, 209; 414/480, 474, 476
See application file for complete search history.

(56) References Cited

U.S. PATENT DOCUMENTS

| | | | |
|---|---|---|---|
| 103,102 A | 5/1870 | Stuntz | |
| 1,247,034 A | 11/1917 | Thompson | |
| 1,336,131 A | 4/1920 | Christie | |
| 1,376,649 A | 5/1921 | Schneider | |
| 1,395,020 A | 10/1921 | Turnbull et al. | |
| 1,443,619 A | 1/1923 | De Virel et al. | |
| 1,443,963 A | 2/1923 | Monsen | |
| 1,503,710 A | 8/1924 | Rice | |
| 1,611,012 A | 12/1926 | Flowers | |
| 1,638,009 A | 8/1927 | Cambessedes | |
| 1,909,342 A | 5/1933 | Galanot | |
| 1,937,062 A | 11/1933 | Kellett | |
| 2,029,995 A | 2/1936 | Flowers | |
| 2,032,840 A | 3/1936 | Flowers | |
| 2,059,212 A | 11/1936 | Dorst | |
| 2,189,052 A | 2/1940 | Anthony | |
| 2,190,869 A | 2/1940 | Frentzel, Jr. et al. | |
| 2,379,094 A | 6/1945 | Maxon, Jr. | |
| 2,426,342 A | 8/1947 | Couse | |
| 2,483,650 A * | 10/1949 | Lee | 180/438 |
| 2,613,827 A | 10/1952 | Van Doorne | |
| 2,653,032 A | 9/1953 | Ellis | |
| 2,712,856 A | 7/1955 | MacPhee | |
| 2,739,837 A | 3/1956 | Sykes | |

(Continued)

FOREIGN PATENT DOCUMENTS

JP 06032168 A 2/1994

(Continued)

*Primary Examiner* — Paul N. Dickson
*Assistant Examiner* — George D. Spisich
(74) *Attorney, Agent, or Firm* — Van Dyke, Gardner, Linn & Burkhart, LLP

(57) ABSTRACT

A cargo carrier for movably supporting cargo includes a frame configured to support cargo at the cargo carrier and at least two wheels at each side of the frame. Each of the wheels is rotatably mounted to a respective support arm. The support arms are pivotally mounted to respective sides of the frame and are pivotable relative to the frame to adjust at least one of a height and tilt of the frame relative to a support surface. The cargo carrier is readily adapted to position the frame at a lower position for road applications and a raised position for uneven terrain applications. The cargo carrier may include a deck that is movably mounted to the frame and is longitudinally movable along the frame.

23 Claims, 23 Drawing Sheets

U.S. PATENT DOCUMENTS

| | | | |
|---|---|---|---|
| 2,741,383 A | 4/1956 | Leckert | |
| 2,786,590 A | 3/1957 | Edwards et al. | |
| 2,798,729 A * | 7/1957 | Paul | 280/35 |
| 2,818,275 A | 12/1957 | Hollowell | |
| 2,849,129 A | 8/1958 | Likens | |
| 2,949,992 A | 8/1960 | Weinberg | |
| 2,999,721 A | 9/1961 | Wood | |
| 3,071,267 A * | 1/1963 | Bunch | 414/476 |
| 3,093,388 A | 6/1963 | Kulyk | |
| 3,096,995 A | 7/1963 | Richnow, Jr. | |
| 3,105,704 A | 10/1963 | Schramm | |
| 3,120,408 A | 2/1964 | Pruss | |
| 3,138,276 A | 6/1964 | Allen et al. | |
| 3,159,294 A | 12/1964 | Forsythe, Jr. | |
| 3,210,120 A | 10/1965 | Gouin | |
| 3,272,546 A | 9/1966 | Cooley | |
| 3,305,110 A | 2/1967 | Tantlinger | |
| 3,314,690 A | 4/1967 | Bunchak | |
| 3,319,932 A | 5/1967 | Szczepanik | |
| 3,328,019 A | 6/1967 | Wilson | |
| 3,376,989 A | 4/1968 | Hilbun | |
| 3,430,792 A | 3/1969 | Grove et al. | |
| 3,439,790 A | 4/1969 | Langley et al. | |
| 3,450,282 A | 6/1969 | Ezolt | |
| 3,485,400 A | 12/1969 | Pewthers | |
| 3,506,144 A | 4/1970 | Carder et al. | |
| 3,520,549 A | 7/1970 | De Lay | |
| 3,640,578 A | 2/1972 | Finney | |
| 3,666,127 A | 5/1972 | Guyaux | |
| 3,684,108 A | 8/1972 | Olson | |
| 3,688,926 A | 9/1972 | Stefanelli | |
| 3,689,106 A | 9/1972 | Young | |
| 3,709,450 A | 1/1973 | Watts et al. | |
| 3,734,538 A | 5/1973 | Humes | |
| 3,743,044 A | 7/1973 | Scheele | |
| 3,762,487 A | 10/1973 | Bilas | |
| 3,874,538 A | 4/1975 | Kessler et al. | |
| 3,893,540 A | 7/1975 | Beucher | |
| 3,934,740 A | 1/1976 | Rumell | |
| 3,944,096 A | 3/1976 | Carder | |
| 3,987,919 A | 10/1976 | Weeks et al. | |
| 4,015,735 A * | 4/1977 | Berglund et al. | 414/420 |
| 4,015,879 A | 4/1977 | Shonkwiler | |
| 4,036,528 A | 7/1977 | Langendorf | |
| 4,077,532 A | 3/1978 | Bryan | |
| 4,139,236 A | 2/1979 | Hill et al. | |
| 4,146,104 A * | 3/1979 | Leembruggen | 180/65.6 |
| 4,203,697 A | 5/1980 | Cayton | |
| 4,230,341 A * | 10/1980 | Hart et al. | 280/124.128 |
| 4,249,843 A | 2/1981 | Kerr | |
| 4,256,326 A * | 3/1981 | Cantrell et al. | 280/683 |
| 4,312,619 A | 1/1982 | Anderson et al. | |
| 4,348,150 A | 9/1982 | Inghram et al. | |
| 4,352,625 A | 10/1982 | Bolderoff | |
| 4,364,574 A * | 12/1982 | Saito | 280/6.157 |
| 4,373,738 A | 2/1983 | Lange | |
| 4,452,496 A | 6/1984 | van der Lely | |
| 4,455,118 A | 6/1984 | Scharf | |
| 4,456,280 A | 6/1984 | Gevers | |
| 4,494,766 A | 1/1985 | McHugh et al. | |
| 4,524,841 A | 6/1985 | Waggoner | |
| 4,541,768 A | 9/1985 | Walker et al. | |
| 4,568,094 A | 2/1986 | Lovell | |
| 4,572,527 A | 2/1986 | Stafford-Mills et al. | |
| 4,593,810 A | 6/1986 | Cook | |
| 4,593,931 A * | 6/1986 | Shiratori et al. | 280/6.157 |
| 4,611,815 A * | 9/1986 | Sasage et al. | 280/6.159 |
| 4,638,887 A | 1/1987 | Kishi | |
| 4,655,667 A | 4/1987 | Plumb et al. | |
| 4,657,099 A | 4/1987 | Baltensperger | |
| 4,673,328 A | 6/1987 | Shiels | |
| 4,690,246 A | 9/1987 | Hornagold et al. | |
| 4,693,485 A * | 9/1987 | Kamei et al. | 280/6.158 |
| 4,694,930 A | 9/1987 | Kishi | |
| 4,702,662 A | 10/1987 | Marlett | |
| 4,736,958 A * | 4/1988 | Armstrong | 280/6.151 |
| 4,737,063 A | 4/1988 | van den Pol | |
| 4,770,592 A | 9/1988 | Winter | |
| 4,787,644 A * | 11/1988 | Yokote et al. | 280/6.157 |
| 4,787,808 A | 11/1988 | Shimoji et al. | |
| 4,806,061 A | 2/1989 | Fenton | |
| 4,854,409 A | 8/1989 | Hillebrand et al. | |
| 4,854,805 A | 8/1989 | Althoff et al. | |
| 4,865,510 A * | 9/1989 | Wegner | 414/498 |
| 4,943,202 A * | 7/1990 | Galloway | 414/475 |
| 4,995,772 A | 2/1991 | Biggio | |
| 5,011,362 A | 4/1991 | Pijanowski | |
| 5,035,439 A | 7/1991 | Petrillo | |
| 5,069,507 A | 12/1991 | Lindsey | |
| 5,110,153 A | 5/1992 | Kallansrude et al. | |
| 5,113,958 A | 5/1992 | Holden | |
| 5,118,241 A | 6/1992 | Cochran et al. | |
| 5,137,297 A * | 8/1992 | Walker | 280/414.5 |
| 5,159,989 A | 11/1992 | Claxton | |
| 5,165,838 A | 11/1992 | Kallansrude et al. | |
| 5,167,295 A | 12/1992 | Moog | |
| 5,184,366 A | 2/1993 | Rawdon et al. | |
| 5,188,379 A | 2/1993 | Krause et al. | |
| 5,191,951 A | 3/1993 | Bargfrede et al. | |
| 5,192,189 A | 3/1993 | Murata et al. | |
| 5,193,063 A | 3/1993 | Assh | |
| 5,219,259 A | 6/1993 | Cochran et al. | |
| 5,246,329 A | 9/1993 | Farrell | |
| 5,246,330 A | 9/1993 | Marmur et al. | |
| 5,269,641 A | 12/1993 | Cochran et al. | |
| 5,285,205 A | 2/1994 | White | |
| 5,328,320 A | 7/1994 | Farrow et al. | |
| 5,348,330 A * | 9/1994 | Few et al. | 280/475 |
| 5,372,353 A | 12/1994 | West | |
| 5,417,540 A | 5/1995 | Cox | |
| 5,433,578 A * | 7/1995 | Honan | 414/476 |
| 5,467,827 A | 11/1995 | McLoughlin | |
| 5,505,481 A | 4/1996 | VanDenberg et al. | |
| 5,529,454 A | 6/1996 | Alm et al. | |
| 5,560,639 A * | 10/1996 | Nowell et al. | 280/6.151 |
| 5,630,694 A | 5/1997 | Ihara | |
| 5,662,453 A | 9/1997 | Gerstner et al. | |
| 5,765,859 A * | 6/1998 | Nowell et al. | 280/86.5 |
| 5,769,502 A | 6/1998 | Bettini | |
| 5,775,868 A | 7/1998 | Mann | |
| 5,778,798 A | 7/1998 | VanDenberg | |
| 5,779,431 A * | 7/1998 | Alm et al. | 414/812 |
| 5,816,765 A * | 10/1998 | Pijanowski | 414/477 |
| 5,851,099 A | 12/1998 | Garcia | |
| 5,863,049 A * | 1/1999 | Mahvi | 280/6.152 |
| 5,871,328 A | 2/1999 | Pinkston | |
| 5,971,493 A | 10/1999 | Robert | |
| 6,045,316 A | 4/2000 | Dole | |
| 6,120,052 A | 9/2000 | Capik et al. | |
| 6,171,047 B1 | 1/2001 | Vandervalk | |
| 6,176,505 B1 | 1/2001 | Capik et al. | |
| 6,276,890 B1 | 8/2001 | Pratt | |
| 6,299,181 B1 * | 10/2001 | Ericksson | 280/6.156 |
| 6,390,761 B1 * | 5/2002 | Palmer et al. | 414/477 |
| 6,447,044 B1 | 9/2002 | Buker et al. | |
| 6,520,736 B2 | 2/2003 | Pratt | |
| 6,530,580 B1 * | 3/2003 | Simpson | 280/6.151 |
| 6,547,335 B2 | 4/2003 | McSweeney | |
| 6,783,187 B2 | 8/2004 | Parsons | |
| 6,796,572 B1 | 9/2004 | McGhie | |
| 6,857,643 B2 * | 2/2005 | Neider | 280/43.18 |
| 7,134,829 B2 * | 11/2006 | Quenzi et al. | 414/482 |
| 7,802,958 B2 * | 9/2010 | Garcia et al. | 414/535 |
| 2002/0036392 A1 | 3/2002 | Damron | |
| 2003/0057663 A1 * | 3/2003 | Trescott | 280/5.514 |
| 2004/0080206 A1 | 4/2004 | Parsons | |
| 2005/0067799 A1 * | 3/2005 | Smith | 280/6.151 |
| 2005/0226707 A1 | 10/2005 | Quenzi et al. | |

FOREIGN PATENT DOCUMENTS

| | | |
|---|---|---|
| JP | 07332893 A | 12/1995 |

* cited by examiner

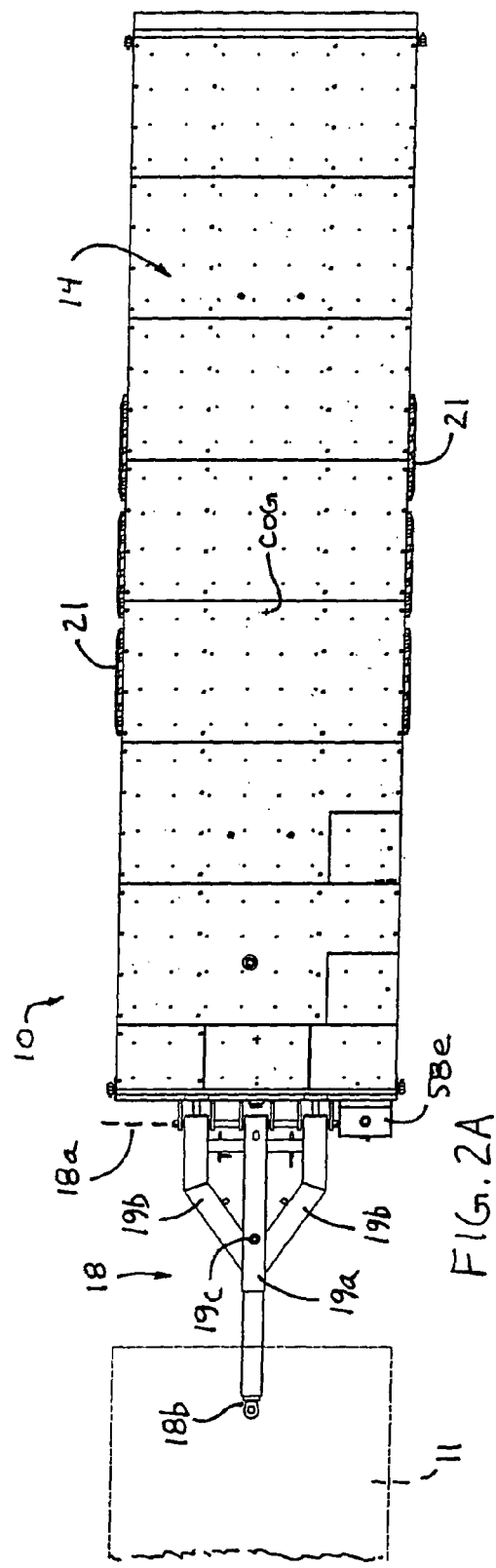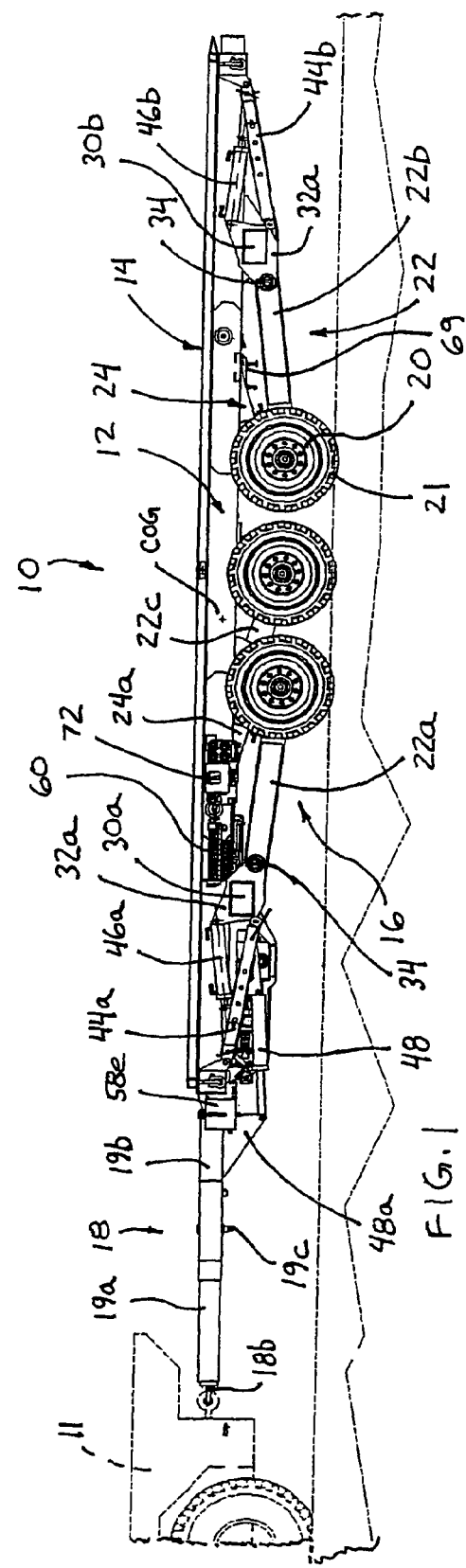

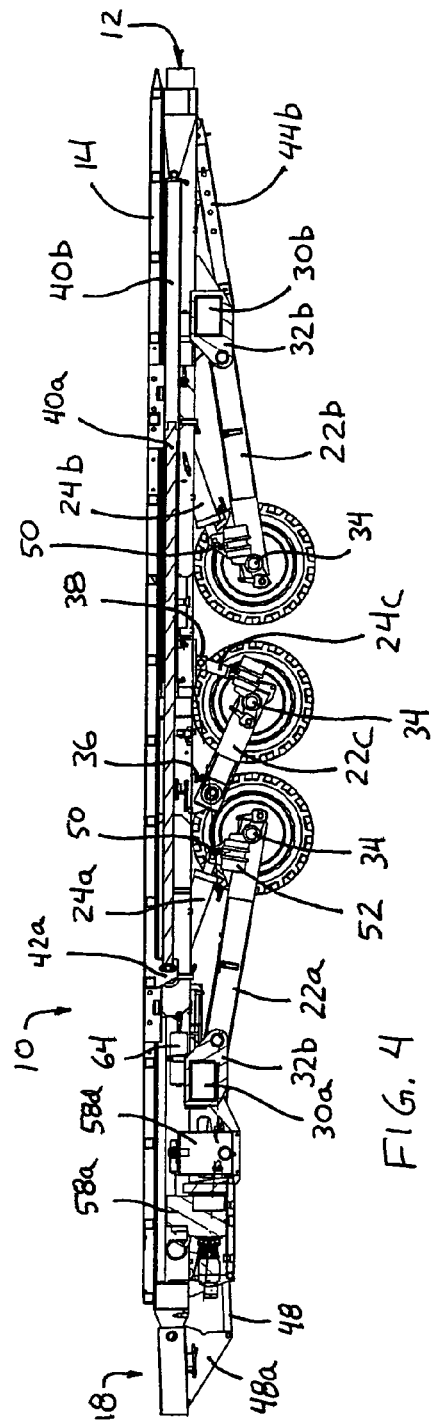
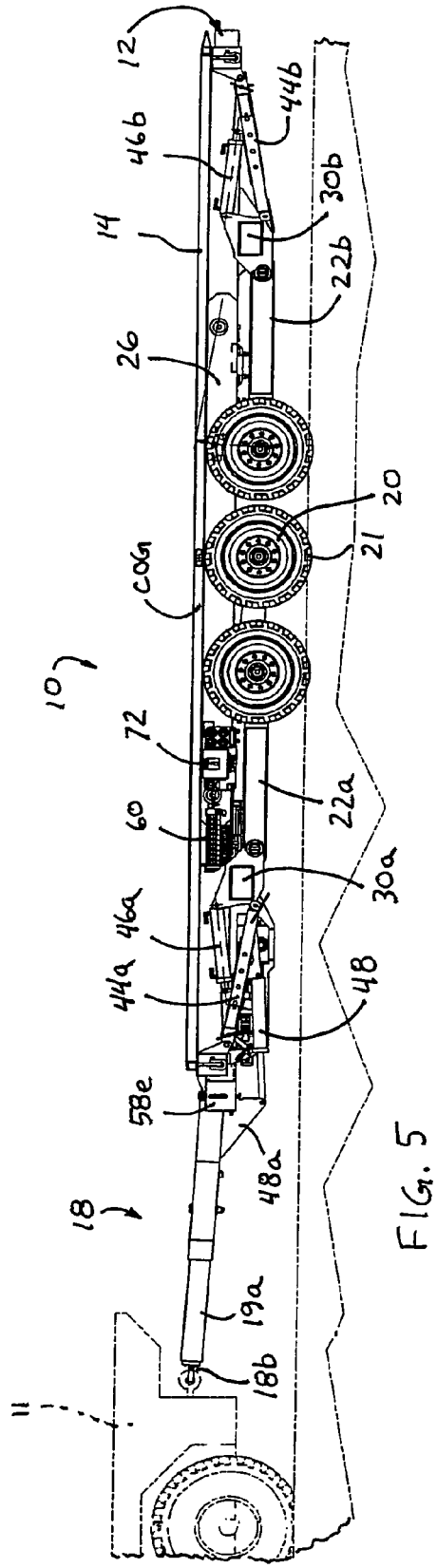
FIG. 4
FIG. 5

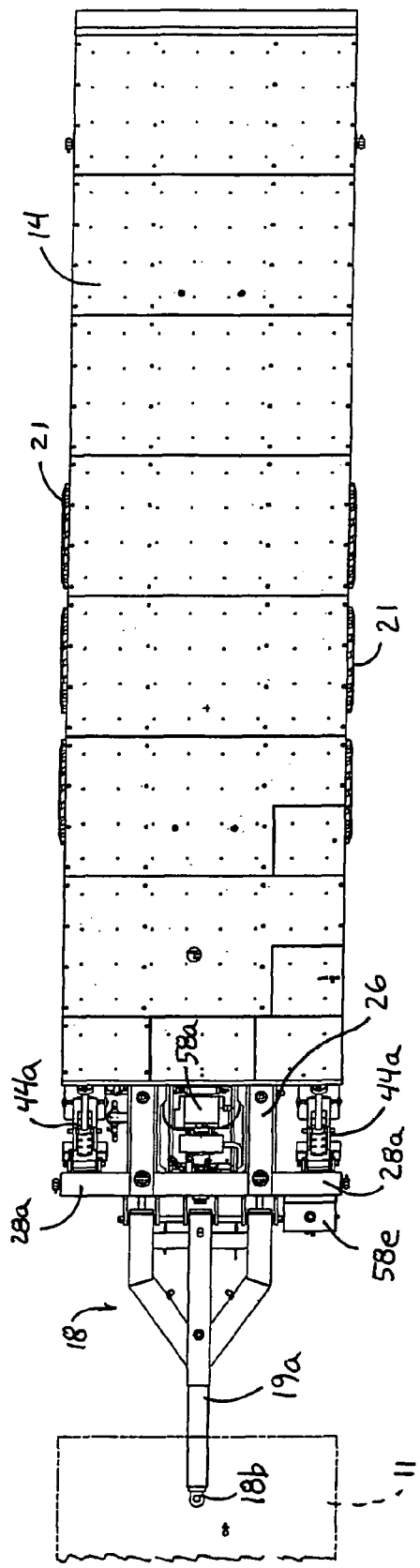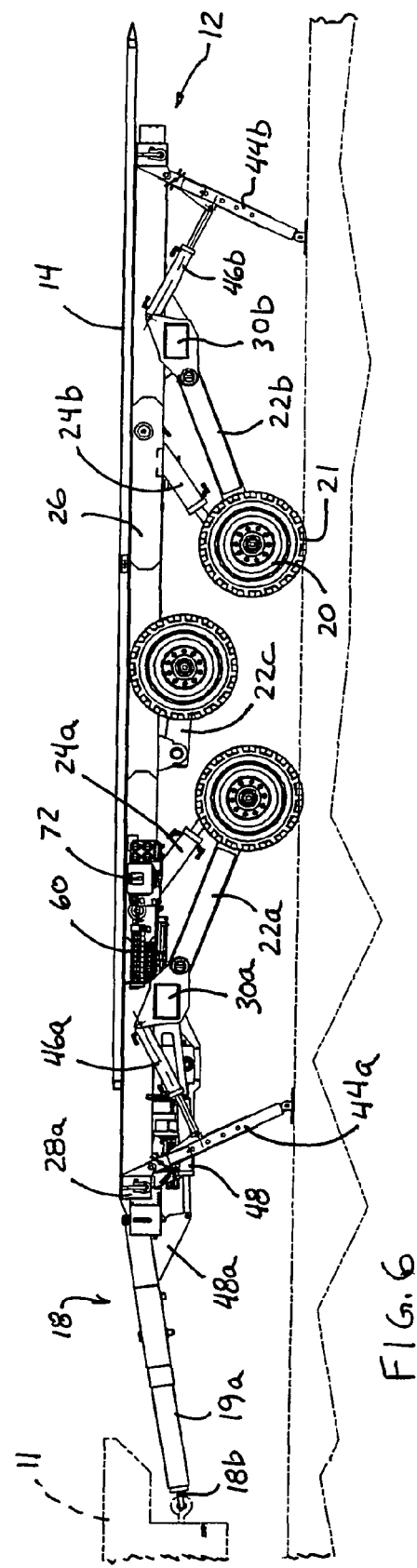

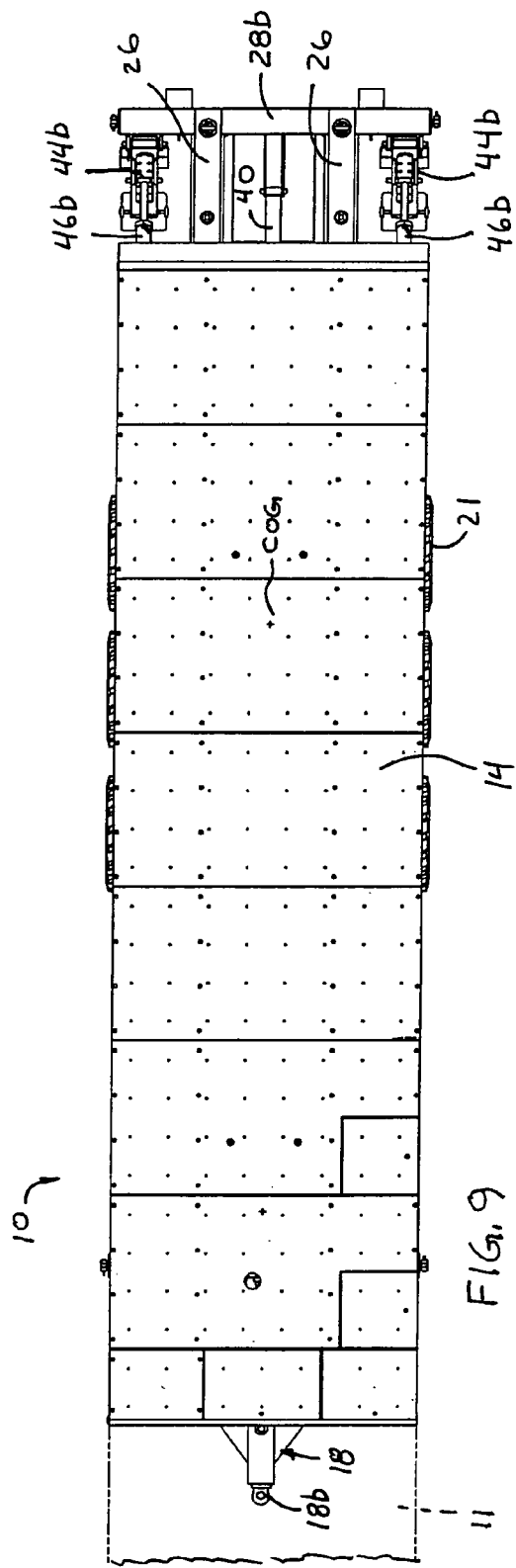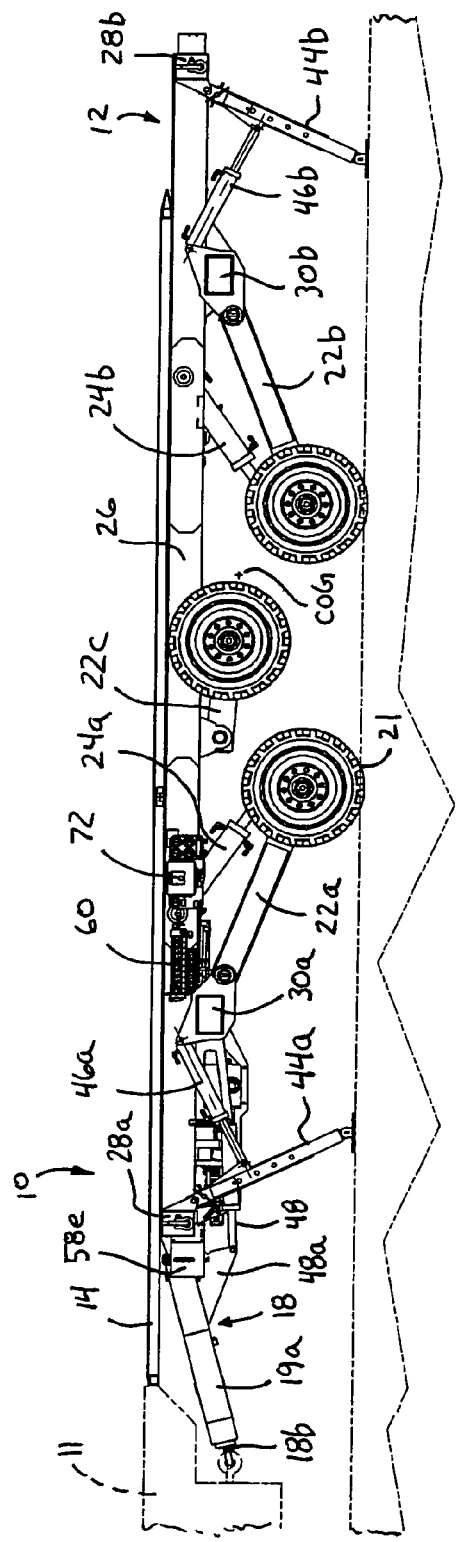

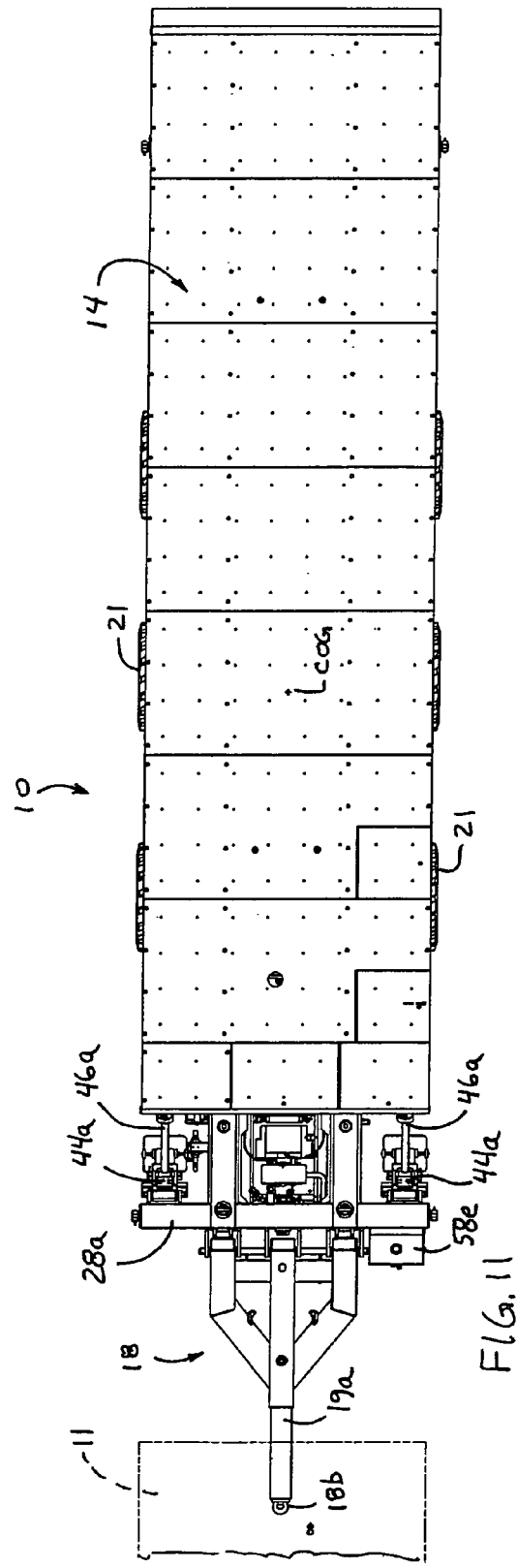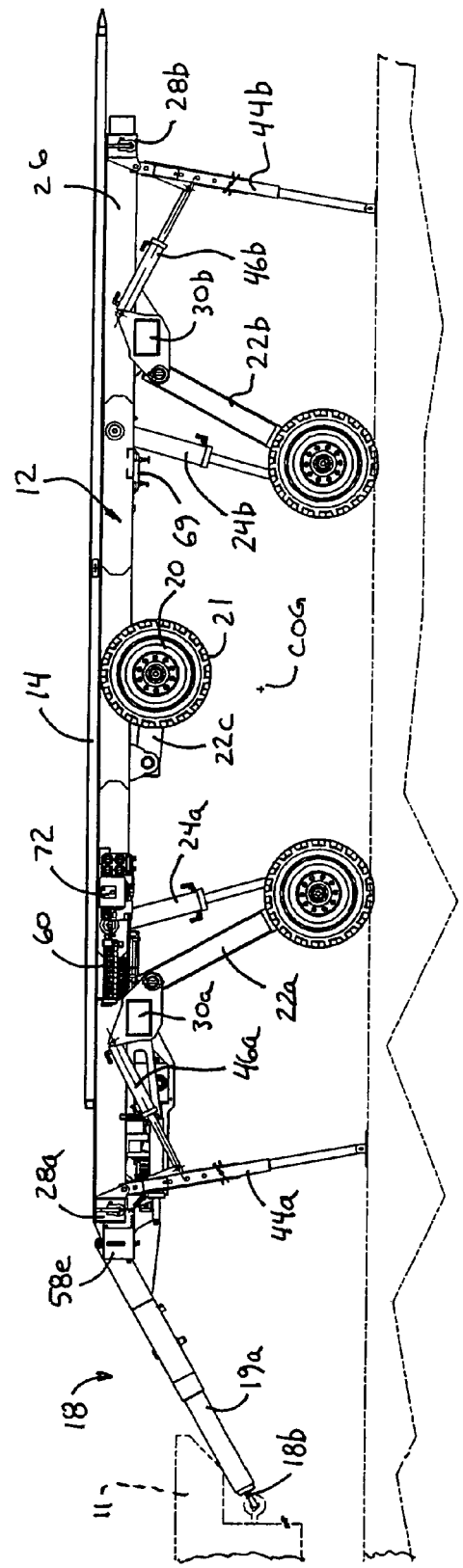
FIG. 11
FIG. 10

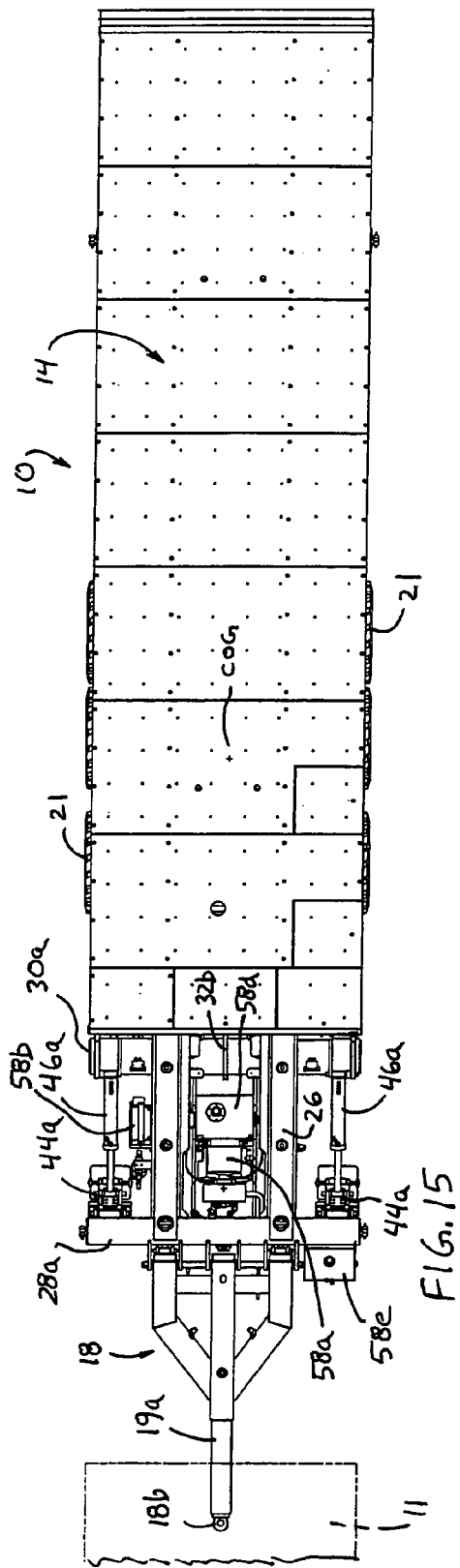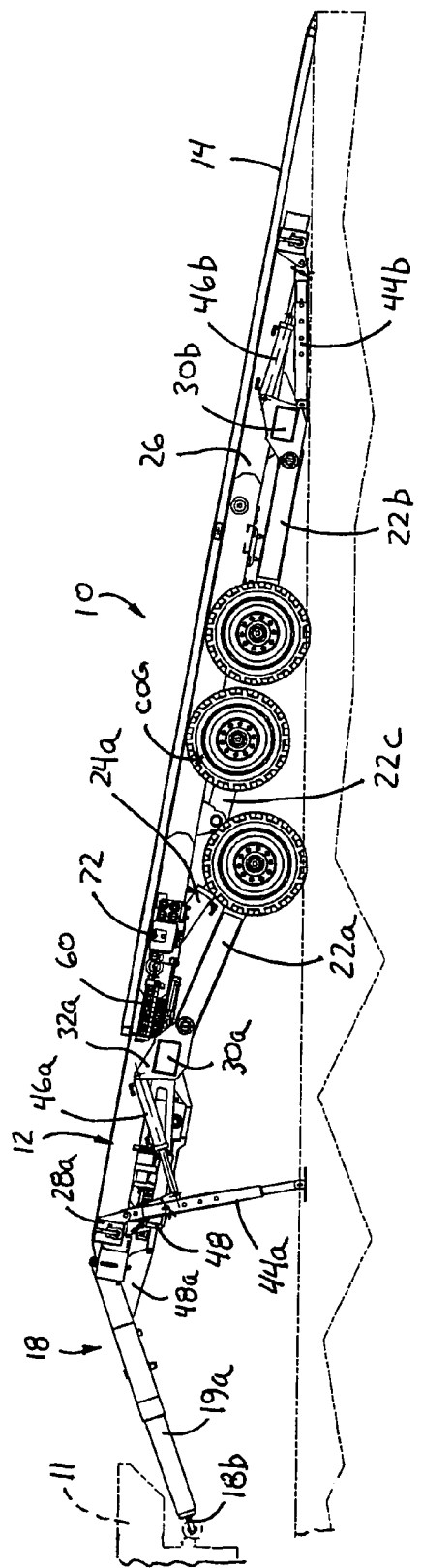

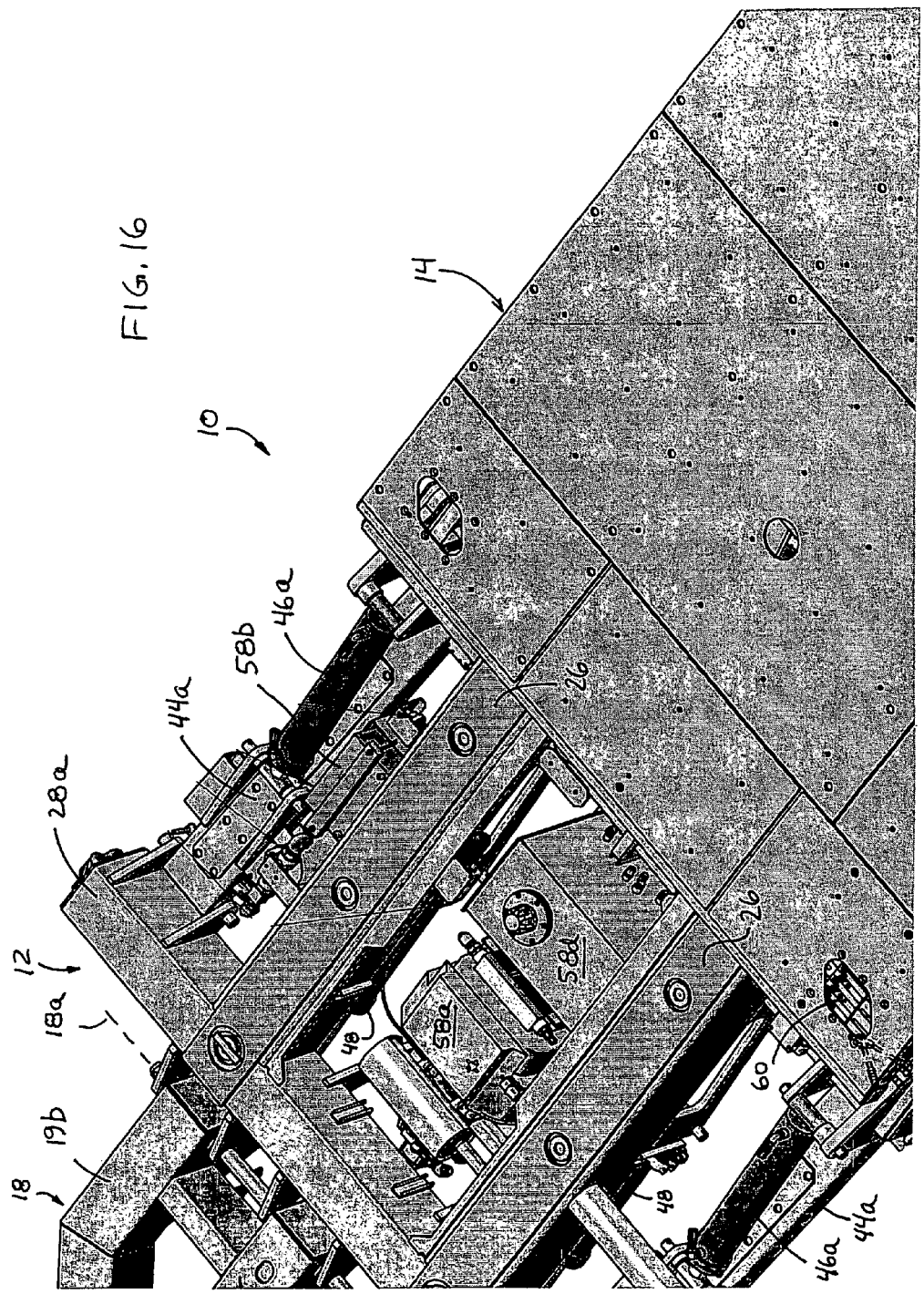

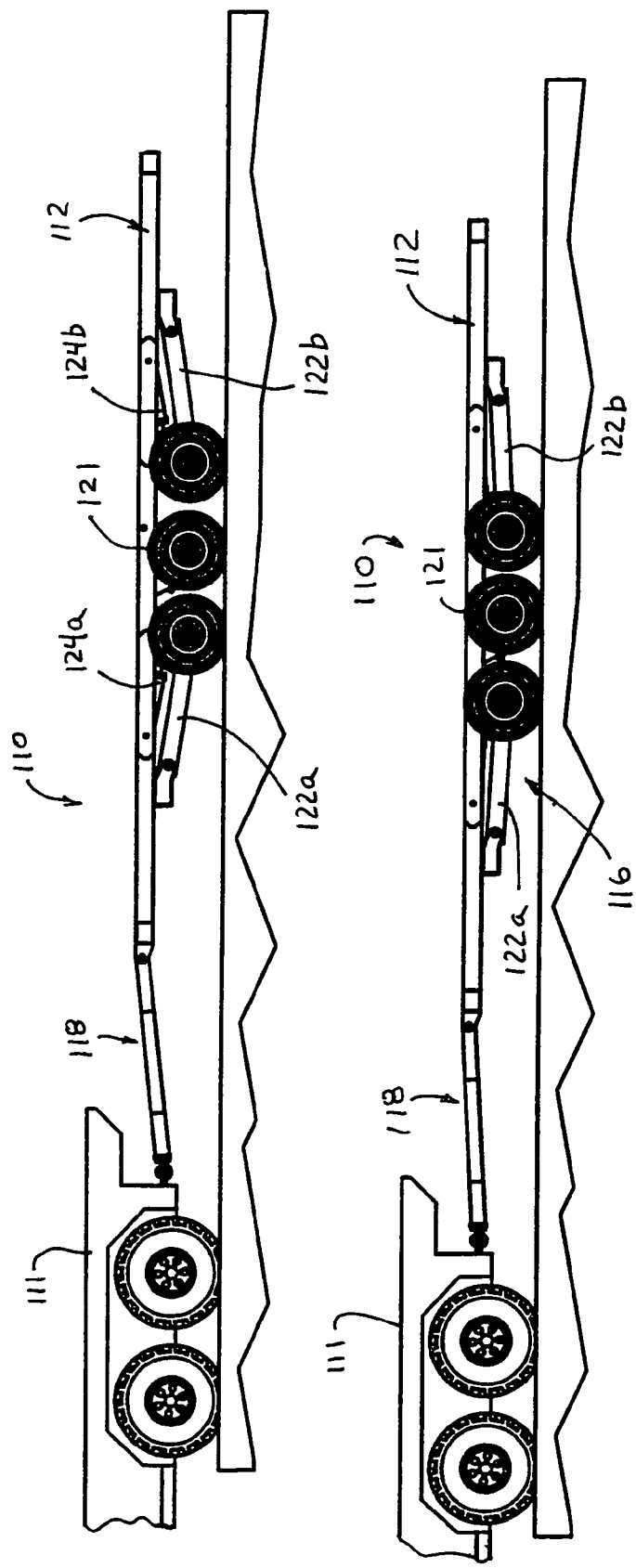

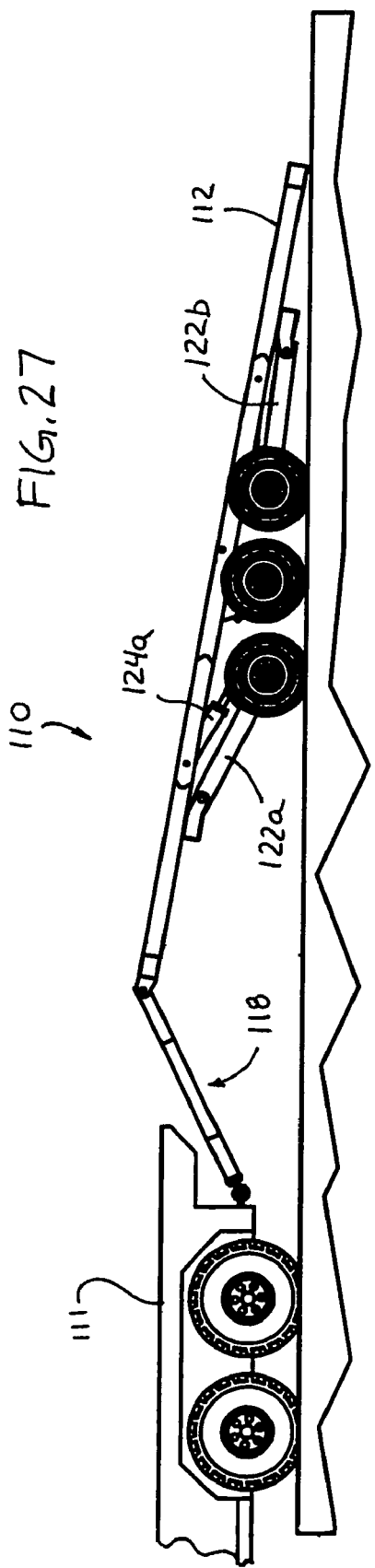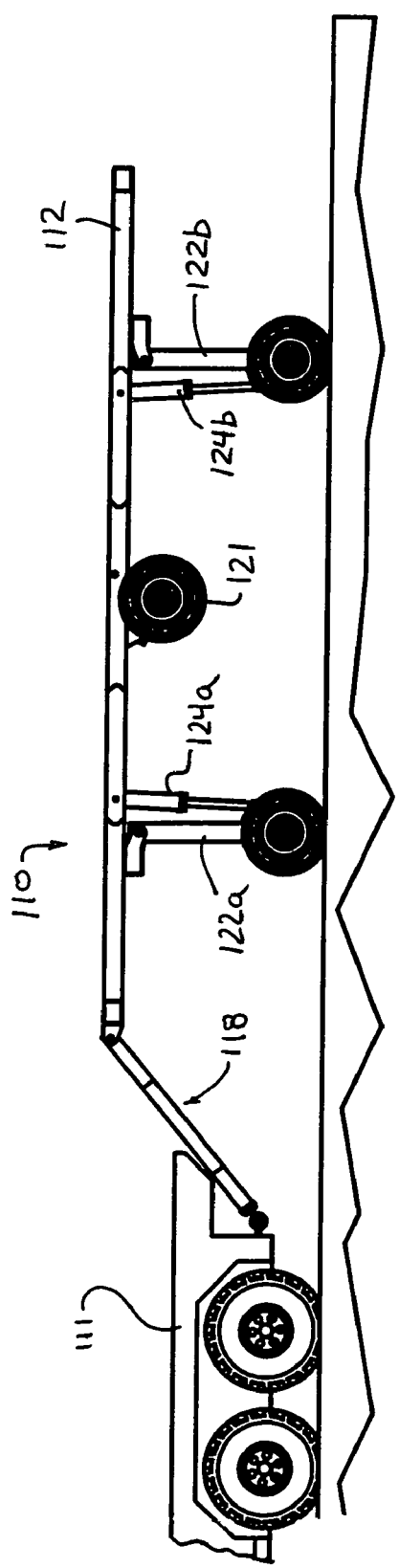

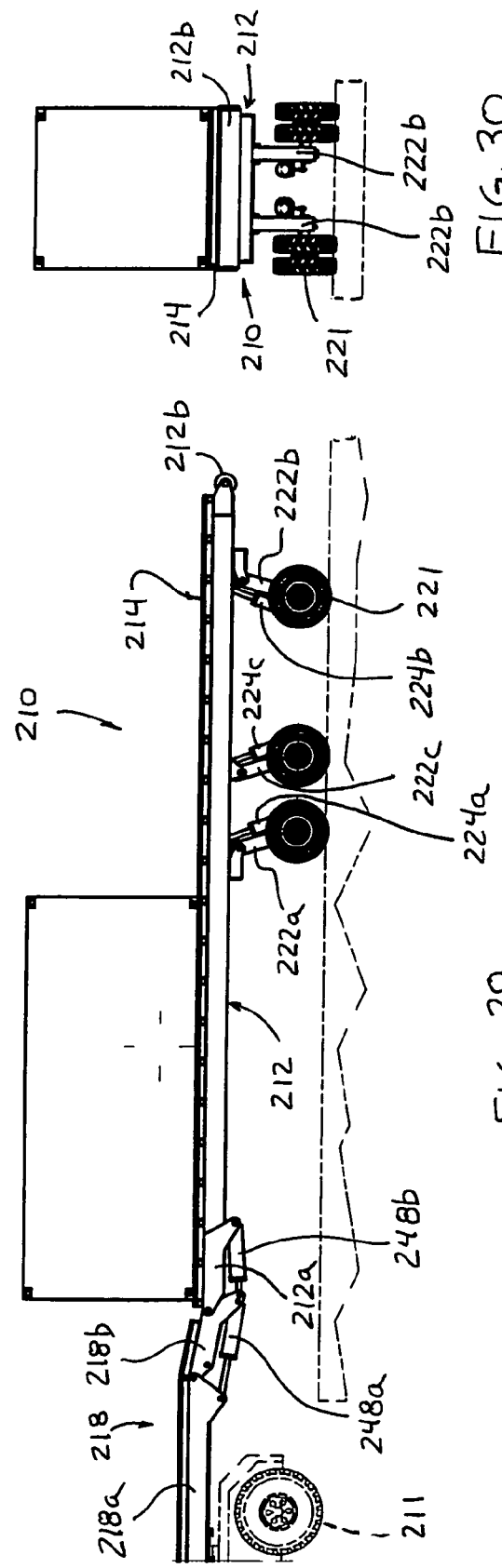

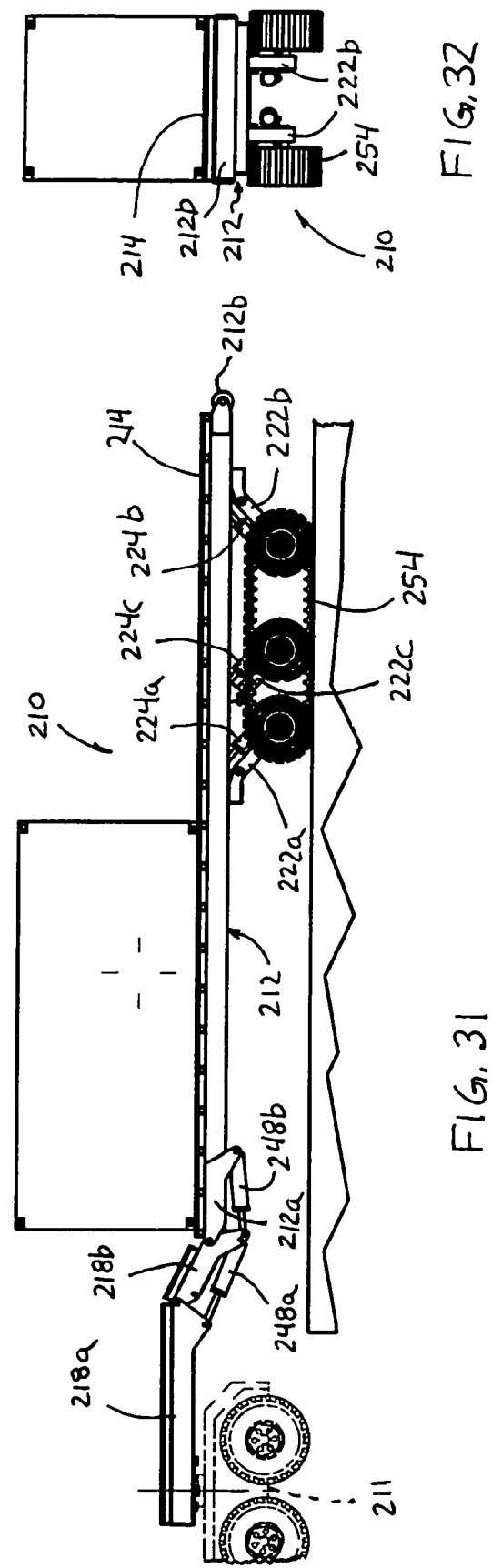

CARGO CARRIER

CROSS REFERENCE TO RELATED APPLICATION

The present application claims benefit of U.S. provisional application Ser. No. 60/680,559, filed May 13, 2005, which is hereby incorporated herein by reference in its entirety.

FIELD OF THE INVENTION

The present invention relates generally to a vehicle or trailer for carrying cargo and, more particularly, to a trailer or truck or other vehicle that may carry cargo on a deck of the trailer or truck or vehicle that is adjustable relative to the wheels and tires of the trailer or truck or vehicle.

BACKGROUND OF THE INVENTION

Vehicles for carrying cargo and for loading cargo into vehicles, such as aircraft and the like, are generally known. Such vehicles typically have a platform that may be raised upward to position the platform at a loading portion of the vehicle or aircraft to ease loading of the cargo from the vehicle to the aircraft. The vehicles may be able to adjust the platform to maintain the platform relatively level at the raised position to support the cargo at the desired level at the aircraft or loading/unloading area. Typically, such vehicles have the cargo lifted upward from the ground and placed on the platform at the vehicle prior to transporting the cargo, and then elevate the platform to the desired height at the targeted vehicle or aircraft. Examples of such vehicles are shown in U.S. Pat. Nos. 3,666,127; 3,688,926; 3,944,096; 5,165,838; 5,630,694 and 6,447,044. Such vehicles often include multiple pivotable arms/linkages which pivot relative to one another and to the frame and platform of the vehicle in order to provide the desired elevational adjustments to the vehicle. Also, although such vehicles are often capable of transporting and elevating cargo to a desired elevated loading area, such as at an aircraft or the like, the cargo or articles must first be lifted upward onto the vehicle platform, which is often cumbersome and difficult to accomplish, and sometimes requires a forklift or the like.

Such known vehicles often allow for adjustment of the height of a deck of the vehicle relative to the ground and include a frame or deck supported by wheels and axles, with the axles including a suspension system for absorbing the impact of the tires with the ground as the vehicle travels over uneven terrain. The ground clearance of such vehicles is limited by the size of the wheels and tires.

Some vehicles provide for adjustment of the height of the deck relative to the axles and ground, and include an adjustment system, such as a hydraulic lift system that raises the deck relative to the axles. The hydraulic system may raise and adjust the deck relative to the ground, such as in the manner described in U.S. Pat. Nos. 3,743,044 and 5,110,153, which are hereby incorporated herein by reference. Such systems are complicated adjustment or elevating systems and do not allow for adjustment of the ground clearance of the trailer or vehicle or allow for the vehicle to travel over uneven terrain.

Therefore, there is a need in the art for an improved trailer or vehicle for carrying cargo and for loading and unloading cargo at platforms or areas of different heights that overcomes the shortcomings of the prior art.

SUMMARY OF THE INVENTION

The present invention provides a cargo carrier that includes a support system for movably supporting a frame and a deck above a plurality of wheels and tires. The wheels are rotatably mounted to individual respective support arms, which are pivotally and adjustably mounted to the frame of the carrier. Pivotal movement of the support arms functions to raise and lower and/or tilt the frame of the carrier to a desired height and/or tilt angle. The support arms thus function to adjustably support the carrier frame, but also function as a suspension system or shock absorbers for the cargo carrier.

According to an aspect of the present invention, a cargo carrier for movably supporting cargo includes a frame configured to support cargo at the cargo carrier and at least two wheels at each side of the frame. Each of the wheels is rotatably mounted to a respective support arm. The wheels are independently mounted to the respective support arms with no axle extending between corresponding wheels at opposite sides of the cargo carrier. The support arms are pivotally mounted to respective sides of the frame and are pivotable relative to the frame to adjust at least one of a height and tilt of the frame relative to a support surface. The cargo carrier is readily adapted to position the frame at a lower position for road applications and a raised position for uneven terrain applications.

According to another aspect of the present invention, a cargo carrier for movably supporting cargo includes a frame, a deck and a support system. The deck is movably mounted to the frame and is longitudinally movable along the frame. The deck is configured to support cargo at the cargo carrier. The support system is for movably supporting the frame and the deck above a support surface. The support system includes a pair of forward lift arms pivotally mounted to respective sides of the frame and a pair of rearward lift arms pivotally mounted to respective sides of the frame. Each of the forward and rearward lift arms extend from the frame and have a respective wheel rotatably mounted at an end thereof. The forward support arms are pivotable relative to the frame to adjust a height of a forward portion of the frame relative to the support surface. The rearward support arms are pivotable relative to the frame to adjust a height of a rearward portion of the frame relative to the support surface.

Optionally, the forward and rearward support arms may be cooperatively adjusted so that the cargo carrier is operable to adapt a respective one of the forward and rearward support arms and wheels for a different level of the support surface relative to the other one of the forward and rearward support arms and wheels. The support arms are pivoted in response to extension and retraction of respective actuators, which may comprise hydraulic cylinders. The hydraulic cylinders may also function to at least partially absorb the impact of the wheels against objects as the cargo carrier is moved along the support surface. The hydraulic cylinders of the forward and rearward support arms at one side of the frame may be cooperatively controlled, while the hydraulic cylinders of the forward and rearward support arms at the other side of the frame may be cooperatively controlled.

The cargo carrier may comprise a trailer, and may include a draw bar pivotally attached at a forward end of the frame and pivotable via an actuator. The draw bar is connectable to a towing vehicle to tow the cargo carrier. Optionally, pivotal movement of the draw bar when the draw bar is connected to a vehicle may cause tilting of the frame and the deck about a generally horizontal and laterally oriented pivot axis.

Therefore, the present invention provides a cargo carrier that has a frame for supporting articles thereon with the frame being raisable and lowerable and tiltable relative to the wheels and tires and support surface or ground via pivotal movement of support arms that extend from the frame and have respective wheels and tires mounted thereon. The cargo carrier thus may be readily adjusted via pivotal movement of the support arms to set the frame (and a deck mounted thereon) at a desired height or tilt angle to ease loading and unloading of the cargo carrier. The wheels and tires are rotatably mounted to the separate respective support arms such that corresponding wheels on opposite sides of the cargo carrier do not have an axle extending therebetween. The support arms and associated actuators function to adjust the height and tilt angle of the frame and also function as a suspension system for the cargo carrier.

These and other objects, advantages, purposes and features of the present invention will become apparent upon review of the following specification in conjunction with the drawings.

BRIEF DESCRIPTION OF THE DRAWINGS

FIG. 1 is a side elevation of a cargo carrier or trailer in accordance with the present invention, with the trailer in a travel position;

FIG. 2A is an upper plan view of the cargo trailer of FIG. 1;

FIG. 4 is a sectional view of the cargo trailer of FIGS. 1-3;

FIG. 5 is a side elevation of the cargo trailer, with the cargo trailer in a fully lowered position;

FIG. 6 is a side elevation of the cargo trailer, with the cargo trailer in a partially raised position and with the deck in a rearward position;

FIG. 7 is a plan view of the trailer of FIG. 6;

FIG. 8 is a side elevation of the cargo trailer, with the cargo trailer in the partially raised position and with the deck in a forward position;

FIG. 9 is a plan view of the trailer of FIG. 8;

FIG. 10 is a side elevation of the cargo trailer, with the cargo trailer in a raised position and the deck in the rearward position;

FIG. 11 is a plan view of the cargo trailer of FIG. 10;

FIG. 14 is a side elevation of the cargo trailer, with the cargo trailer in a tilted position for loading the trailer;

FIG. 15 is a plan view of the cargo trailer of FIG. 14;

FIG. 16 is an enlarged perspective view of the forward portion of the cargo trailer of the present invention;

FIG. 22 is a side elevation of a cargo carrier or trailer in accordance with the present invention, with the trailer in a fully lowered position;

FIG. 23 is another side elevation of the cargo trailer of FIG. 22, with the trailer in slightly raised or elevated position;

FIG. 25 is another side elevation of the cargo trailer of FIGS. 22-24, with the trailer in a raised position;

FIG. 27 is another side elevation of the cargo trailer of FIGS. 22-26, with the trailer in a tilted position;

FIG. 29 is a side elevation of a fifth wheel type cargo carrier or trailer of the present invention, with the trailer in a raised position;

FIG. 30 is a rear end elevation of the cargo trailer of FIG. 29;

FIG. 31 is another side elevation of the fifth wheel type cargo carrier or trailer of the present invention, with the trailer in a lowered position and with tracks or treads around the wheels of the trailer;

FIG. 32 is a rear end elevation of the cargo trailer of FIG. 31; and

DESCRIPTION OF THE PREFERRED EMBODIMENTS

Figure 2B:
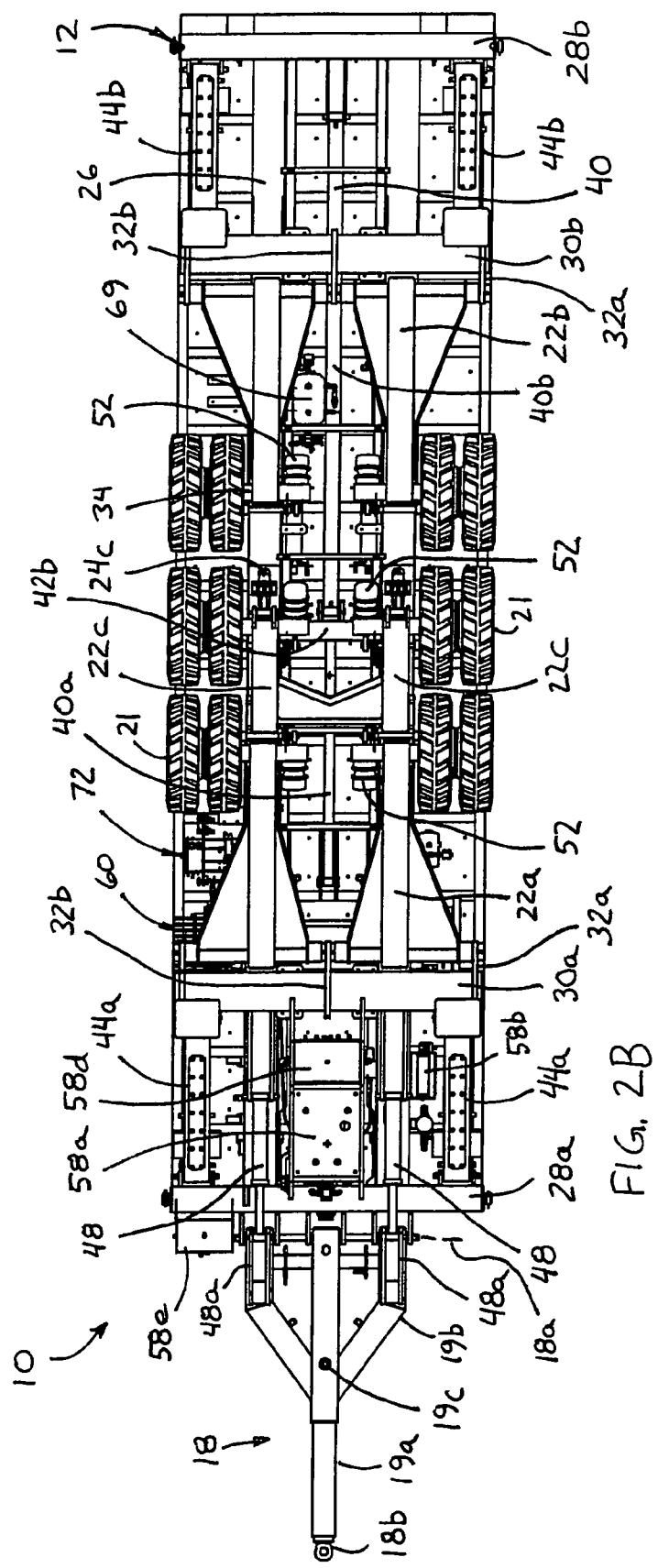
FIG. 2B is a lower plan view of the cargo trailer of FIG. 1.
Figure 3:
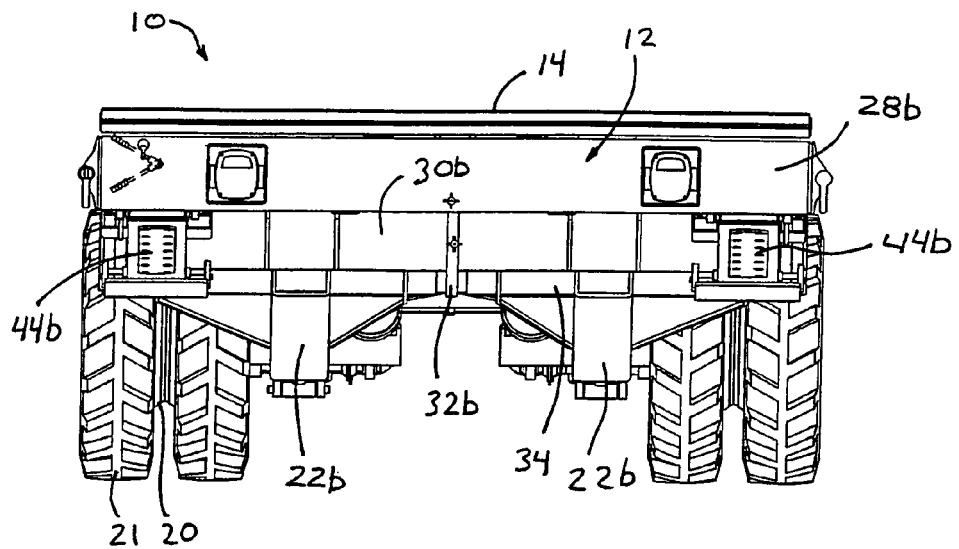
FIG. 3 is a rear end elevation of the cargo trailer of FIGS. 1 and 2.
Figure 13:
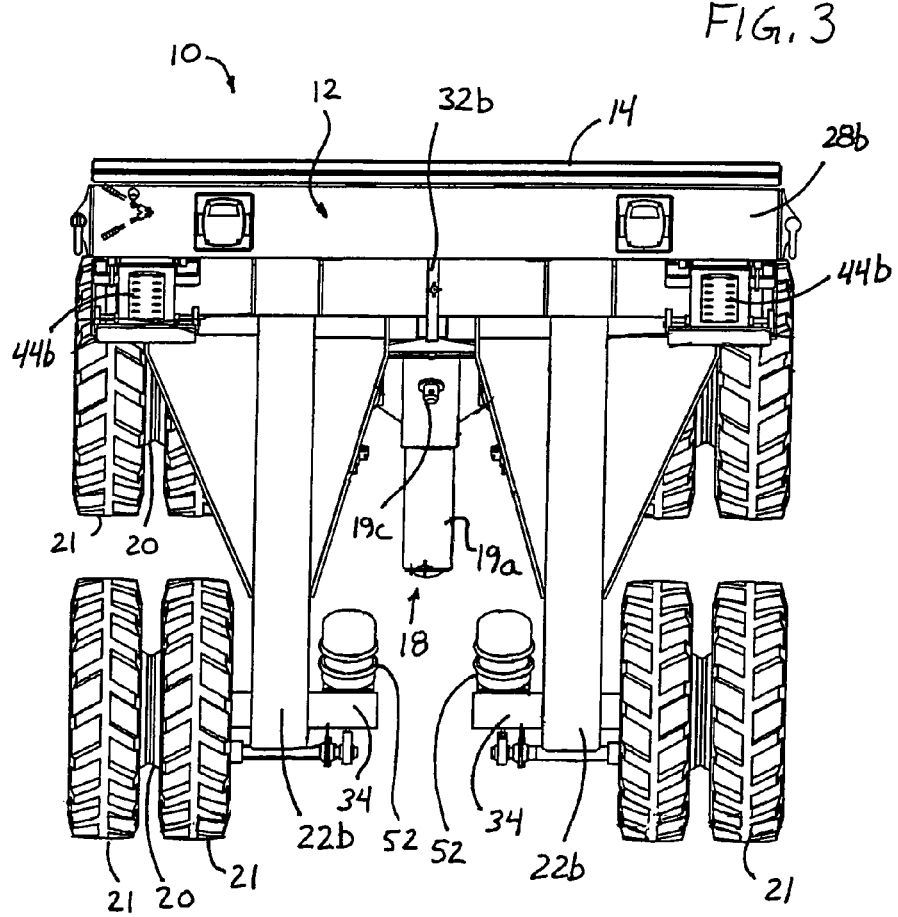
FIG. 13 is a rear end elevation of the cargo trailer of FIG. 12.

Referring now to the drawings and the illustrative embodiments depicted therein, a cargo carrier or cargo trailer 10 includes a frame or frame portion 12 and a deck or deck portion 14 mounted to the frame 12, which is supported by a support system 16 (FIGS. 1-15). Cargo carrier 10 is connectable to a tow vehicle 11 via a draw bar or tow bar or arm 18 at a forward end of the cargo carrier. Support system 16 includes wheels 20 and tires 21 rotatably mounted to support arms or members or elements 22, which are adjustably or pivotally mounted to frame 12. Each wheel 20 and tire 21 (or two wheels and tires in tandem as can be seen in FIGS. 3 and 13) is/are rotatably mounted to a respective support arm 22, such that no axle extends between the corresponding support arms and wheels at respective arms at opposite sides of the cargo carrier. Thus, the cargo carrier 10 may provide increased ground clearance and enhanced handling capabilities of uneven terrain. Support system 16 includes actuators 24, such as hydraulic cylinders or the like, for independently or cooperatively adjusting or pivoting the support arms 22 to raise and lower the frame 12 and deck 14 relative to the ground and/or to adjust the orientation or tilt angle of the frame 12 and deck 14, as discussed below. The actuators 24 extend and retract to adjust the pivot angle of the support arms 22 to adjust the height of the frame 12 and deck 14, and also act as the suspension system for the wheels and tires to absorb the impact of the wheels against objects such as may occur as the trailer travels over uneven terrain, as also discussed below.

Support system 16 includes a pair of forward support arms 22a and respective actuators 24a and wheels 20 and tires 21 and a pair of rearward support arms 22b and respective actuators 24b and wheels 20 and tires 21. Optionally, and desirably, and as shown in the illustrated embodiment, support system 16 also includes a pair of center support arms 22c and respective actuators 24c and wheels 20 and tires 21. In the illustrated embodiment, forward and rearward support arms 22a, 22b are pivotally mounted to frame 12 and may substantially raise and lower the frame 12 and deck 14 via pivotal movement of arms 22a and/or 22b relative to frame 12, such as via extension and retraction of the respective actuators 24a, 24b (which may also be pivotally mounted to frame 12 at a longitudinally different location along the frame relative to the mounting location of the respective support arms). As can be seen with reference to FIGS. 6 and 10, the support arms pivot toward one another, such that the forward support arms 22*a* pivot or angle rearward (from a forwardly located pivot axis) and rearward pivot arms 22*b* pivot or angle forward (from a rearwardly located pivot axis). Center support arms 22*c* may pivot in either direction, such as rearwardly as shown in the illustrated embodiment.

In the illustrated embodiment, center arms 22*c* are shorter than forward and rearward support arms 22*a*, 22*b*, and thus the wheels and tires at center arms 22*c* do not contact the ground when the forward and rearward support arms 22*a*, 22*b* are lowered (such as shown in FIGS. 6, 8, 10 and 12). Optionally, however, the center arms may be the same length as the forward and rearward arms or the center arms may be omitted from the cargo carrier, while remaining within the spirit and scope of the present invention.

Support arms 22*a-c* are each pivotally mounted at their upper ends to frame 12 and each have a respective wheel 20 and tire 21 rotatably mounted at or near their lower or opposite ends. Actuators 24*a-c* are also pivotally mounted at their upper ends to frame 12 and are pivotally attached to the respective support arms. For example, actuators may comprise hydraulic cylinder actuators with a hydraulic cylinder pivotally mounted at the frame portion and with a piston rod pivotally attached to the respective support arm at a location along the support arm below the upper end of the support arm. Thus, extension and retraction of the actuators imparts a corresponding pivotal movement of the respective support arms, while the actuators may also pivot during extension/retraction of the actuators and pivotal movement of the support arms.

Frame 12 may comprise any suitable frame structure for mounting support arms 22 thereto and for supporting deck 14. In the illustrated embodiment, and as best seen with reference to FIGS. 4 and 17 (which depicts cargo carrier 10 with the deck removed therefrom), frame includes a pair of longitudinal members 26 extending substantially the length of cargo carrier 10 and a forward cross member 28*a* and a rearward cross member 28*b* at or near opposite ends of the longitudinal members and extending therebetween. Draw bar 18 is pivotally mounted at forward cross member 28*a* and is pivotable to adjust the angle of the draw bar 18 relative to frame 12 and/or to cause tilting of the frame 12 relative to the support surface or ground, as discussed below.

Frame 12 includes a forward support cross member 30*a* and a rearward support cross member 30*b* attached to longitudinal members 26, such as at a lower portion of the longitudinal members and toward respective forward and rearward ends of the longitudinal members. A pair of forward support arms 22*a* are pivotally mounted to forward support cross member 30*a* at opposite ends thereof, while a pair of rearward support arms 22*b* are pivotally mounted to rearward support cross member 30*b*. In the illustrated embodiment, the support arms 22*a*, 22*b* are mounted to and between mounting brackets 32*a*, 32*b* attached to and extending from cross members 30*a*, 30*b*. Mounting brackets 32*a* are attached to (such as via welding or otherwise securing) cross members 30*a*, 30*b* at or near the outer ends of the cross members, while mounting brackets 32*b* (FIGS. 3, 4, 13 and 17) are attached to (such as via welding or otherwise securing) cross members 30*a*, 30*b* at a generally central location of the cross members. The brackets 32*a*, 32*b* pivotally receive or support or mount a pivot axle or partial axle 34 of support arms 22*a*, 22*b*, as discussed below. Likewise, the actuators 24*a*, 24*b* may be pivotally mounted to frame 12, such as by being pivotally received or mounted at the longitudinal members 26, such as to respective brackets or flanges extending from the longitudinal members 26.

In the illustrated embodiment, frame 12 also includes mounting brackets 36 (FIG. 4) at the longitudinal members 26 (such as at an underside of the longitudinal members) for pivotally mounting center support arms 22*c* to frame 12. Likewise, brackets 38 (FIG. 4) may be attached to longitudinal members 26 (such as at an underside of the longitudinal members) for pivotally receiving or mounting actuators 24*c* to frame 12.

Figure 17:
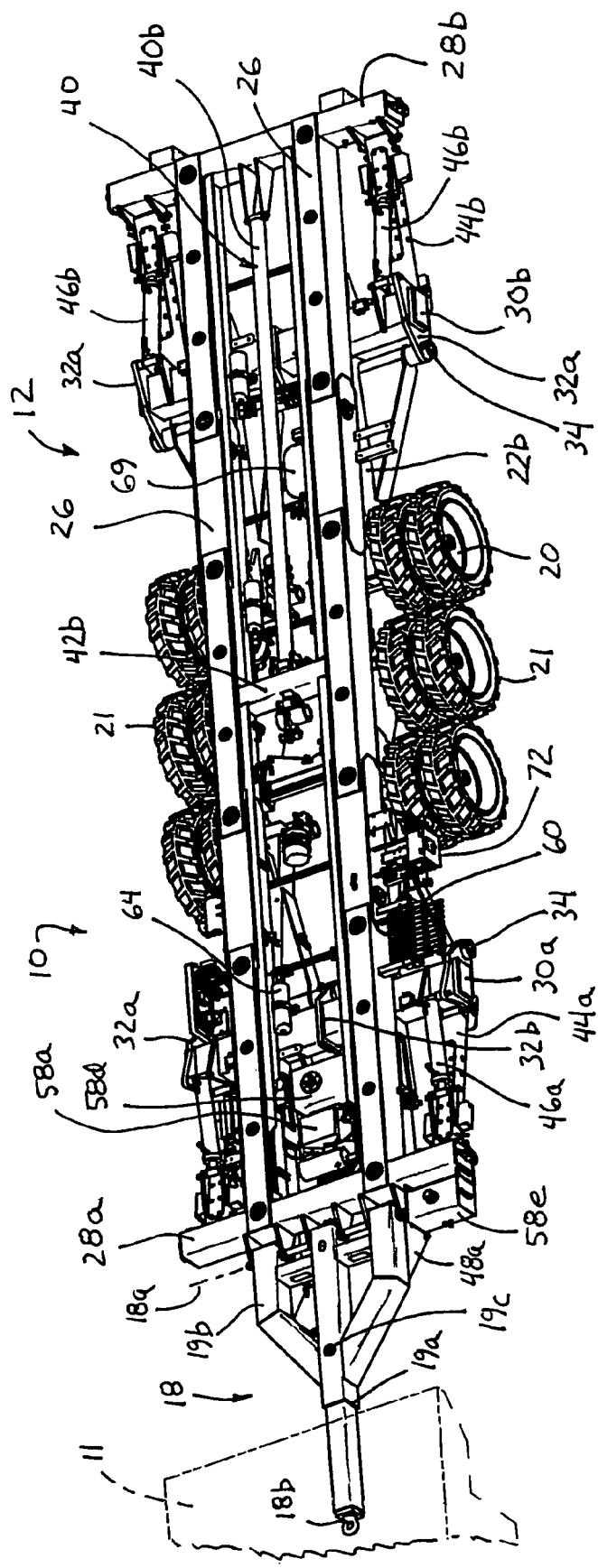
FIG. 17 is an upper perspective view of the cargo trailer, with the deck removed to show additional details of the trailer.

Frame 12 provides an upper surface that supports deck 14 thereon. In the illustrated embodiment, deck 14 is longitudinally movable relative to frame 12 so as to be adjustable or movable between a rearward position (as shown in FIGS. 6 and 7), a generally centered position (as shown in FIGS. 1, 2A, 2B, 4 and 5) and a forward position (as shown in FIGS. 8 and 9) to assist in loading/unloading of articles on the deck, as discussed below. Deck 14 is movable along frame 12 via an actuator 40 (FIGS. 4, 17 and 20), such as a hydraulic cylinder or the like, where extension and retraction of the actuator 40 moves the deck longitudinally relative to the frame 12. As can be seen in FIGS. 4 and 17, actuator 40 is mounted at one end to rearward cross member 28*b* and at the other end (such as at an end of a piston rod 40*a* that extends/retracts relative to a cylinder 40*b* of the hydraulic actuator) to a bracket or flange or mounting element 42*a* attached at a lower portion of deck 14. The cylinder 40*b* of the actuator 40 may be supported at rearward cross member 28*b* and at or near its other end by a support member or element 42*b* (FIG. 17) attached to longitudinal members 26 of frame 12. Thus, the cylinder 40*b* may be supported at its opposite ends by the frame 12, while the piston rod 40*a* is attached to the deck, such that extension and retraction of the piston rod of the actuator 40 causes longitudinal movement of deck 14 along frame 12. The deck may slide along slide elements of the frame or may roll (such as via bearings or the like) or otherwise move along the upper portion of the frame, without affecting the scope of the present invention.

Deck 14 may comprise a generally flat deck or platform or may comprise other configurations depending on the type of cargo that is being carried by the cargo carrier. For example, the deck may include conveying devices to assist in moving articles along the deck, if desired. Optionally, the deck may be fixedly mounted to the frame or the frame may support articles directly thereon without a deck attached thereto (such as discussed below with respect to cargo carrier 110 of FIGS. 22-28), while remaining within the spirit and scope of the present invention.

Cargo carrier 10 includes a pair of forward stabilizers 44*a* (such as at opposite sides or ends of forward cross member 28*a*) and a pair of rearward stabilizers 44*b* (such as at opposite sides or ends of rearward cross member 28*b*), which are mounted to frame 12 and function to support and stabilize the frame if desired. In the illustrated embodiment, stabilizers 44*a*, 44*b* are pivotally mounted at the respective cross member 28*a*, 28*b* of frame and are pivotable between a raised position (as shown in FIGS. 1-5) and a lowered or partially lowered position (as shown in FIGS. 6-10), where the stabilizers engage the ground (such as via a pad or foot or plate of each of the stabilizers engaging the ground or surface) to support and stabilize the cargo carrier when the carrier is not being moved over the support surface or ground. Stabilizers 44*a*, 44*b* may be pivoted via a respective actuator 46*a*, 46*b*, such as a hydraulic cylinder or the like, which may be pivotally attached to support cross members 30*a*, 30*b*, such as at brackets 32*a* or the like, whereby extension and retraction of actuators 46*a*, 46*b* cause pivotal movement of the respective stabilizers to pivot the stabilizer between the raised and lowered positions. Stabilizers 44*a*, 44*b* are preferably longitudinally adjustable to adjust the length of the stabilizers to accommodate the degree of elevation of the frame and deck via the support system 16. The stabilizers thus may be lengthened or shortened, such as via manual longitudinal adjustment (such as via adjusting a telescoping stabilizer having an outer member or portion and an inner member or portion and pinning or otherwise securing the outer and inner members relative to one another when the stabilizer is at the desired or appropriate length) or via an actuator or hydraulic cylinder that extends and retracts to extend and retract the stabilizer, without affecting the scope of the present invention.

Draw bar 18 is pivotally attached at the forward cross member 28a of frame 12 and is pivotable about a generally horizontal lateral pivot axis 18a so that the connecting end 18b of draw bar 18 may be readily vertically adjusted to align and connect with a towing portion of a vehicle 11. In the illustrated embodiment, draw bar 18 includes a center member or element 19a and a pair of side members or elements 19b that are pivotally mounted to forward cross member 28a and that are pivotable about the horizontal pivot axis 18a via a pair of actuators 48, which are connected at one end to a respective downward extending bracket 48a of side members 19b of draw bar 18 and at the other end to frame 12. Thus, extension and retraction of actuators 48 causes pivotal movement of draw bar 18 about pivot axis 18a to raise and lower the connecting end 18b of draw bar 18. Optionally, extension and retraction of actuators 48 and the corresponding pivotal movement of draw bar 18 may cause tilting of the frame 12 and deck 14 about a generally horizontal and laterally extending pivot axis, as discussed below. For example, the actuators 48 may be retracted to tilt the rear of the deck toward the ground, such as shown in FIG. 14 and discussed below.

Optionally, draw bar 18 may be longitudinally extendable and retractable to adjust the length thereof so as to provide a desired or appropriate length draw bar depending on the vehicle connection or the desired distance between the tow vehicle and the cargo carrier. For example, the draw bar may comprise a telescopic center member 19a that may extend and retract and that may be pinned (such as via a locking pin or element 19c or the like) to retain the member at the desired degree of extension or retraction. As shown in FIGS. 1, 2A, 2B and 5-7, draw bar 18 may be extended to space the deck and frame from the rear of the vehicle, or, and as shown in FIGS. 8 and 9, the draw bar may be retracted to draw the trailer or carrier toward the vehicle, such as for loading or moving articles from the deck 14 onto the vehicle (such as when the deck is moved to its forward position as shown in FIGS. 8 and 9). Optionally, the draw bar may extend and retract via an actuator, such as a hydraulic cylinder or the like, while remaining within the spirit and scope of the present invention.

Support system 16 is operable to selectively pivot the forward support arms 22a (via extension and retraction of actuators 24a) and/or the rearward support arms 22b (via extension and retraction of actuators 24b) to adjust the height and tilt of frame 12 and deck 14. Likewise, actuators 24c may extend and retract to pivot center support arms 22c to adjust the position of the wheels and tires of support arms 22c relative to the frame 12 in a similar manner. Because the actuators 24a, 24b, 24c are mounted to frame 12 at a different location than the respective support arms 22a, 22b, 22c, extension and retraction of the actuators causes pivotal movement of the support arms about their respective generally horizontal pivot axes at the frame 12, which in turn causes a generally downward and upward movement of the wheels and tires relative to the frame. For example, extension of actuators 24a, 24b causes pivotal movement of support arms 22a, 22b to raise or elevate frame 12 and deck 14 above the ground, while retraction of actuators 24a, 24b causes pivotal movement of support arms 22a, 22b in the opposite direction to lower frame 12 and deck 14 toward the ground. Extension or retraction of one of the sets of actuators 24a or 24b (such as while the other does not extend or retract or while the other moves in the opposite direction) may cause a tilting of the frame and deck relative to the ground, as discussed below.

Support arms 22a, 22b, 22c comprise substantially rigid support arms that pivotally mount to the frame 12 and that have the wheels rotatably mounted thereto (such as to a respective partial axle 34 (FIG. 4) at the lower end of each support arm. The actuators 24a, 24b, 24c are pivotally mounted to frame 12 and pivotally mounted to a mounting bracket 50 at a lower end of support arm and at or near partial axle 34. Thus, the actuators provide a suspension function to the support system by compressing or retracting when the tires impact an object or bump to act as shock absorbers for the cargo carrier.

Optionally, and as shown in FIG. 4, support system 16 may include a braking device or actuator 52 at some or all of the wheels to provide braking or control of the wheels as the cargo carrier is moved along the road or ground. In the illustrated embodiment, braking device 52 comprises a pneumatic braking device, such as are known in the art and discussed below. Optionally, the support system 16 may include one or more drive motors (not shown), such as hydraulic drive motors or the like, at one or more of the wheels to provide a drive function to facilitate movement of the trailer when the trailer is not connected to a towing vehicle.

Figure 18:
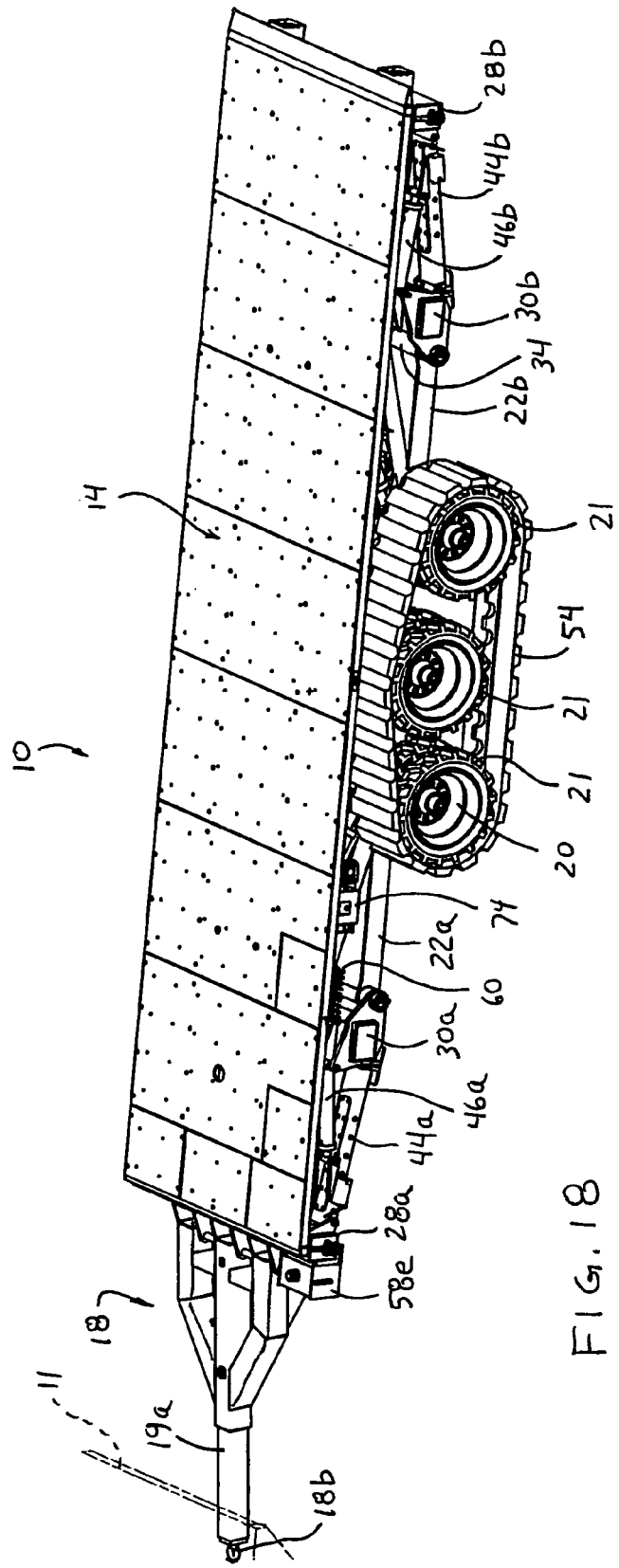
FIG. 18 is a perspective view of the cargo trailer, with a tread around the wheels of the cargo trailer.
Figure 19:
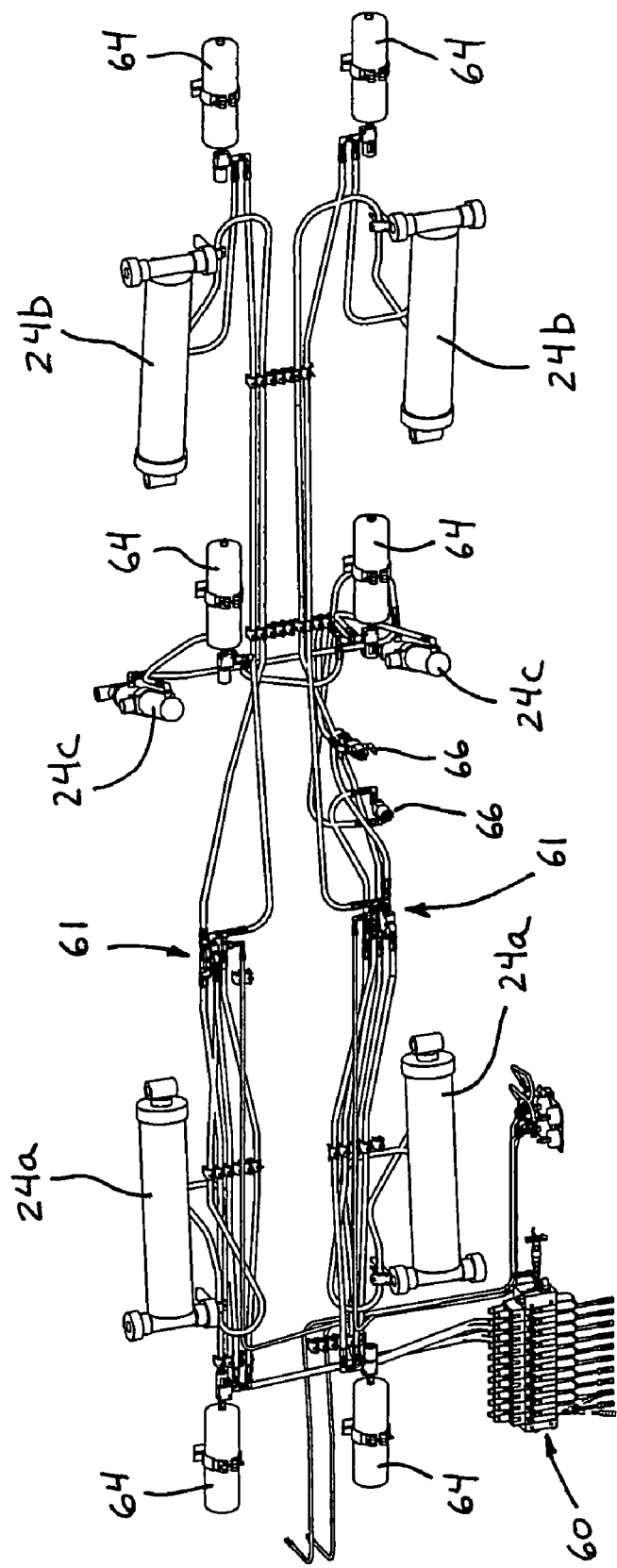
FIG. 19 is a perspective view of a hydraulic suspension system useful with the cargo trailer of the present invention.

Optionally, and as shown in FIG. 18, a treaded belt or track 54 may be provided around the tires 21 at each side of the cargo carrier 10, in order to enhance traction of the tires to limit slippage of the tires at the ground or mud or the like. In order to install or provide the belt 54 at and around the tires 21, the support arms 22a, 22b may be pivoted upward to position the tires close enough together so that the belt is positionable around the tires. Pivotal movement of the support arms 22a, 22b away from one another may then set the desired tension in the belt 54. Optionally, and as shown in FIG. 18, the tension in the belt 54 may also or otherwise be set by raising the center tire 21 upward to adjust the tension to the desired amount.

Figure 20:
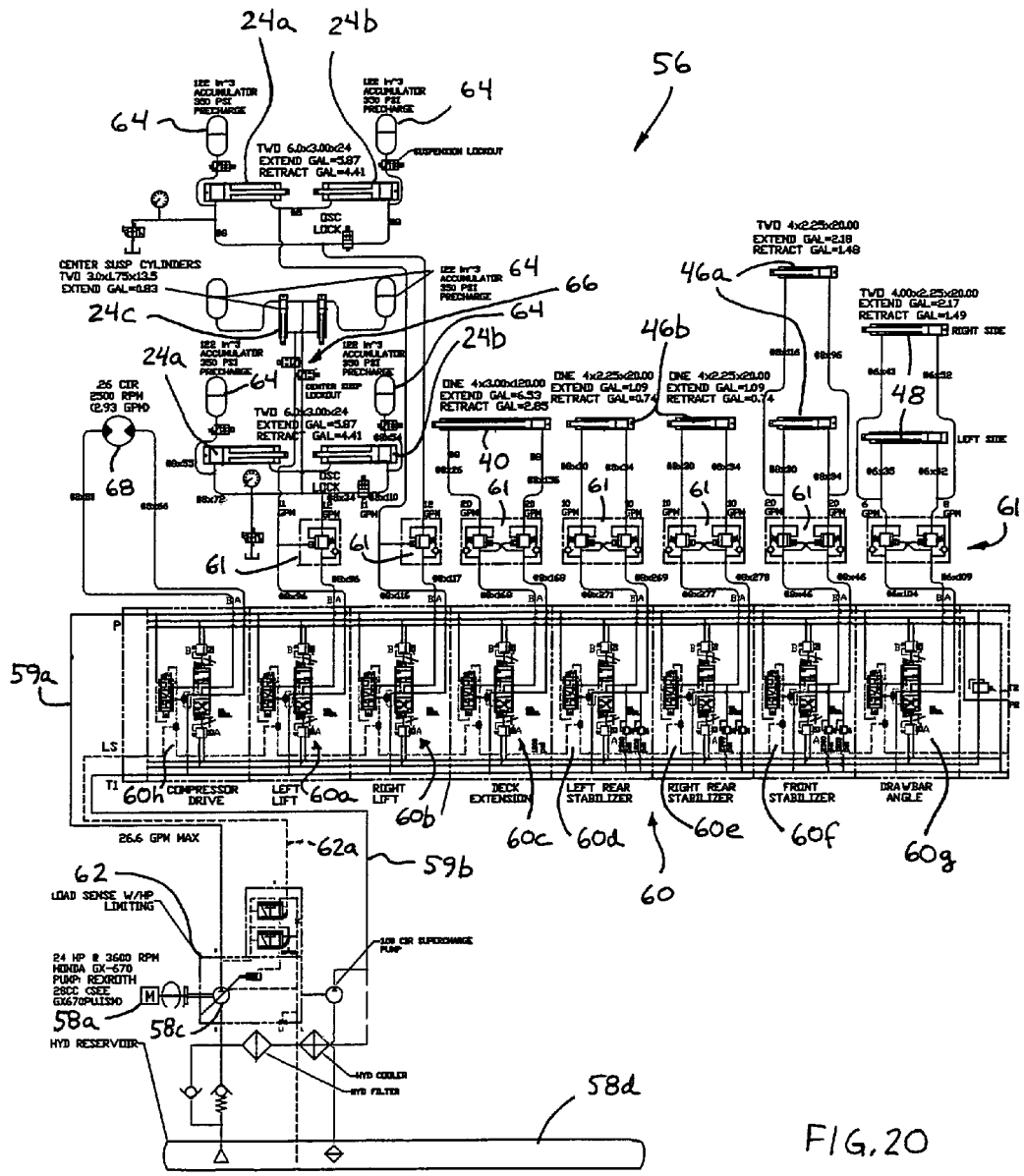
FIG. 20 is a schematic diagram of a hydraulic control system useful with the cargo trailer of the present invention.

In the illustrated embodiment, actuators 24a-c, 40, 46a, 46b and 48 are double-acting hydraulic cylinders or actuators with piston rods that extend and retract from respective cylinders in response to pressurized fluid selectively provided at either end of the respective cylinder. The pressurized fluid or oil is provided to the actuators via a hydraulic control system 56 (FIG. 20), which includes a power source or engine or motor 58a (which may be connected to a battery 58b (FIG. 16) or other power source and which receives fuel from a fuel tank 58e (FIG. 17)) and a pump 58c for providing pressurized fluid (from a fluid reservoir or tank 58d) to a plurality of directional control valves or solenoid valves 60, which are selectively controlled to direct the pressurized fluid to the appropriate end or ends of the appropriate cylinder or cylinders to achieve the desired movement or adjustment of the cargo carrier. As can be seen in FIG. 20, the hydraulic control system 56 includes a pressure line 59a that connects the pump 58c to the directional control valves 60 and a tank or return line 59b that connects the directional control valves 60 to the fluid reservoir or tank 58d. The control valves 60 direct pressurized fluid to the appropriate end of the appropriate cylinder (and may direct the fluid through counter-balance valves 61) depending on the selected or desired or appropriate function that the trailer is performing.

Optionally, the hydraulic control system 56 includes a load sensor 62 and sensing line 62*a* for sensing the pressure in the hydraulic lines and sending a signal to the pump or to a control to make sure that the pump provides enough flow to handle the desired or appropriate or required pressure. For example, if the trailer is performing more than one function at a given time, the load sensor 62 senses the function with the highest required pressure (such as by sensing the highest pressure at the control valves) and controls the pump to produce enough flow to handle that function.

Desirably, the lift actuators 24*a*, 24*b*, 24*c* (or the forward and rearward lift actuators 24*a*, 24*b*) on one side of the cargo carrier (for example, the left side of the cargo carrier) are pressurized via a common control valve 60*a*, while the lift actuators 24*a*, 24*b*, 24*c* (or the forward and rearward lift actuators 24*a*, 24*b*) on the other side of the cargo carrier (for example, the right side of the cargo carrier) are likewise pressurized via a common control valve 60*b*. The center lift actuators 24*c* may be controlled in parallel with the forward and rearward lift actuators 24*a*, 24*b* or may be controlled independently, depending on the particular application of the cargo carrier. The left and right lift actuators thus may be proportionally controlled, and the actuators on each respective side may extend and retract together or may cooperatively or correspondingly extend and retract, and may extend and retract relative to one another depending on the resistance encountered by each of the actuators or support arms. The left front and left rear lift actuators thus may be cooperatively controlled or controlled in parallel while the right front and right rear lift actuators may be cooperatively controlled or controlled in parallel. Thus, control of the lift actuators on one side relative to the lift actuators on the other side may tilt the frame in a side-to-side manner.

The actuators along each respective side of the cargo carrier may readily extend or retract or float so as to function as a suspension system. For example, when the tire of one of the support arms (such as the left forward support arm) impacts an object, the corresponding left forward lift actuator may retract as the left forward support arm pivots rearward and upward in response to the impact. As the left forward lift actuator retracts, fluid or oil from the left forward lift actuator is forced from the left forward lift actuator to the left rearward lift actuator, which causes the left rearward support arm to pivot downward. Thus, the cargo carrier may be driven or moved over uneven terrain while the tires at the forward and rearward support arms are maintained in engagement with the terrain, even when the obstacles or objects or terrain is substantially uneven. Optionally, it is envisioned that the hydraulic control system may independently control each of the lift actuators 24*a*, 24*b* (and 24*c* if applicable) depending on the particular application and desired functions of the cargo carrier.

Optionally, the hydraulic control system 56 may include an accumulator 64 at each lift cylinder 24*a*, 24*b*, 24*c*, which functions to pre-charge or pressurize one end of each of the cylinders so as to bias the cylinders toward their extended (lifting) state. Optionally, the hydraulic control system 56 may include center lift actuator lock-out valves 66, which are selectively actuated to lock out the center lift actuators 24*c* so that the center support arms 22*c* are substantially secured or not moved when control valves 60*a*, 60*b* are actuated.

As can be seen in FIG. 20, a control valve 60*c* functions to extend and retract the deck extension actuator 40 to move the deck forward and rearward relative to the frame. In the illustrated embodiment, the left and right rear stabilizers 44*b* are independently raised and lowered via respective control valves 60*d*, 60*e* controlling the respective actuator 46*b*, while the front stabilizers 44*a* are raised and lowered via their respective actuators 46*a* in response to a common control valve 60*f*. Both of the draw bar actuators 48 may function in a similar manner in response to a common control valve 60*g*. Optionally, hydraulic control system 56 may include a compressor drive motor 68 and associated control valve 60*h*, which functions to pressurize or provide pressurized air to a pressure tank or air chamber 69 (FIGS. 1, 2B, 10, 12 and 17), which may selectively provide pressurized air to the pneumatic braking devices 52, as discussed below.

Figure 21:
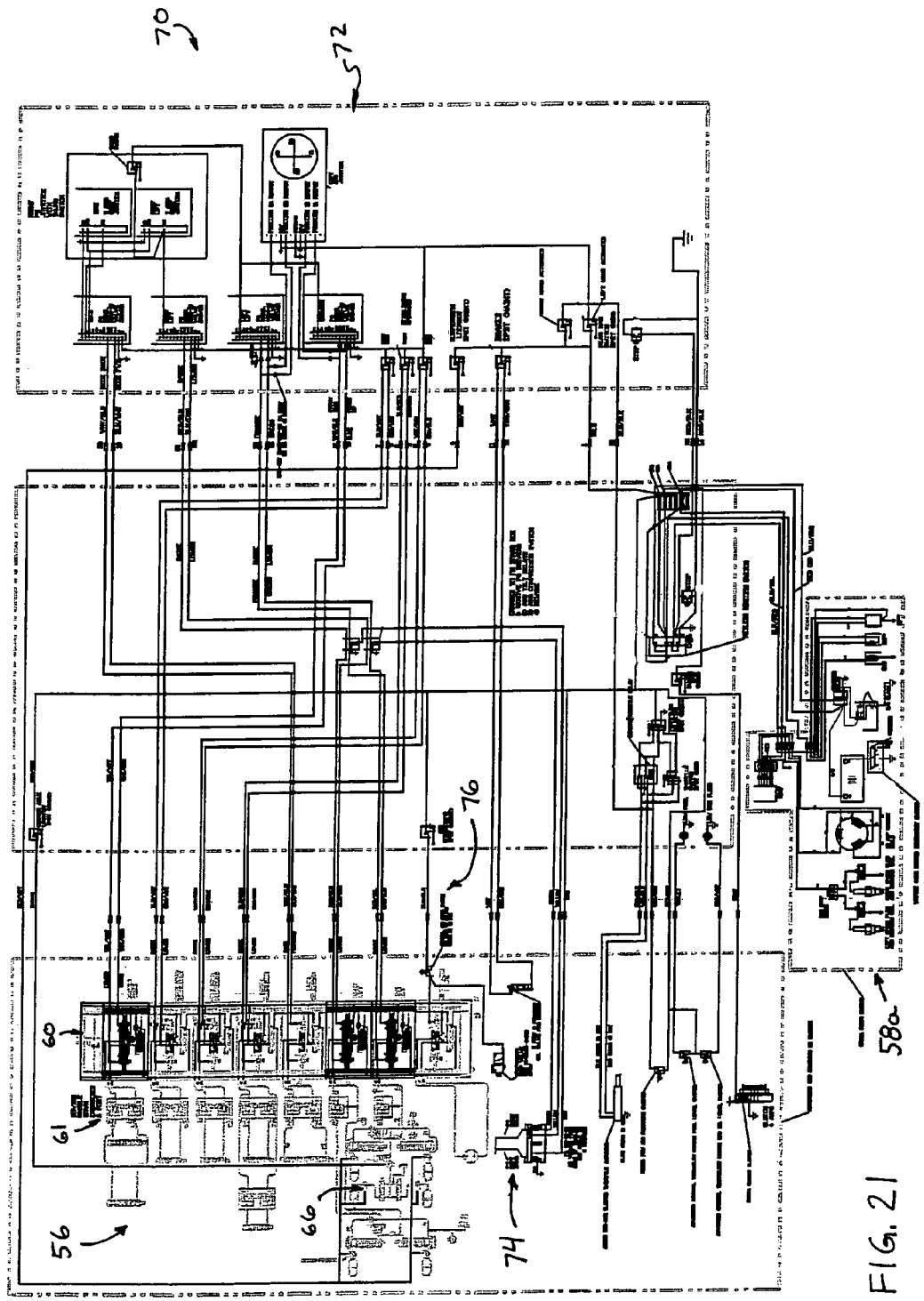
FIG. 21 is a schematic diagram of an electrical system useful with the cargo trailer of the present invention.
Figure 24:
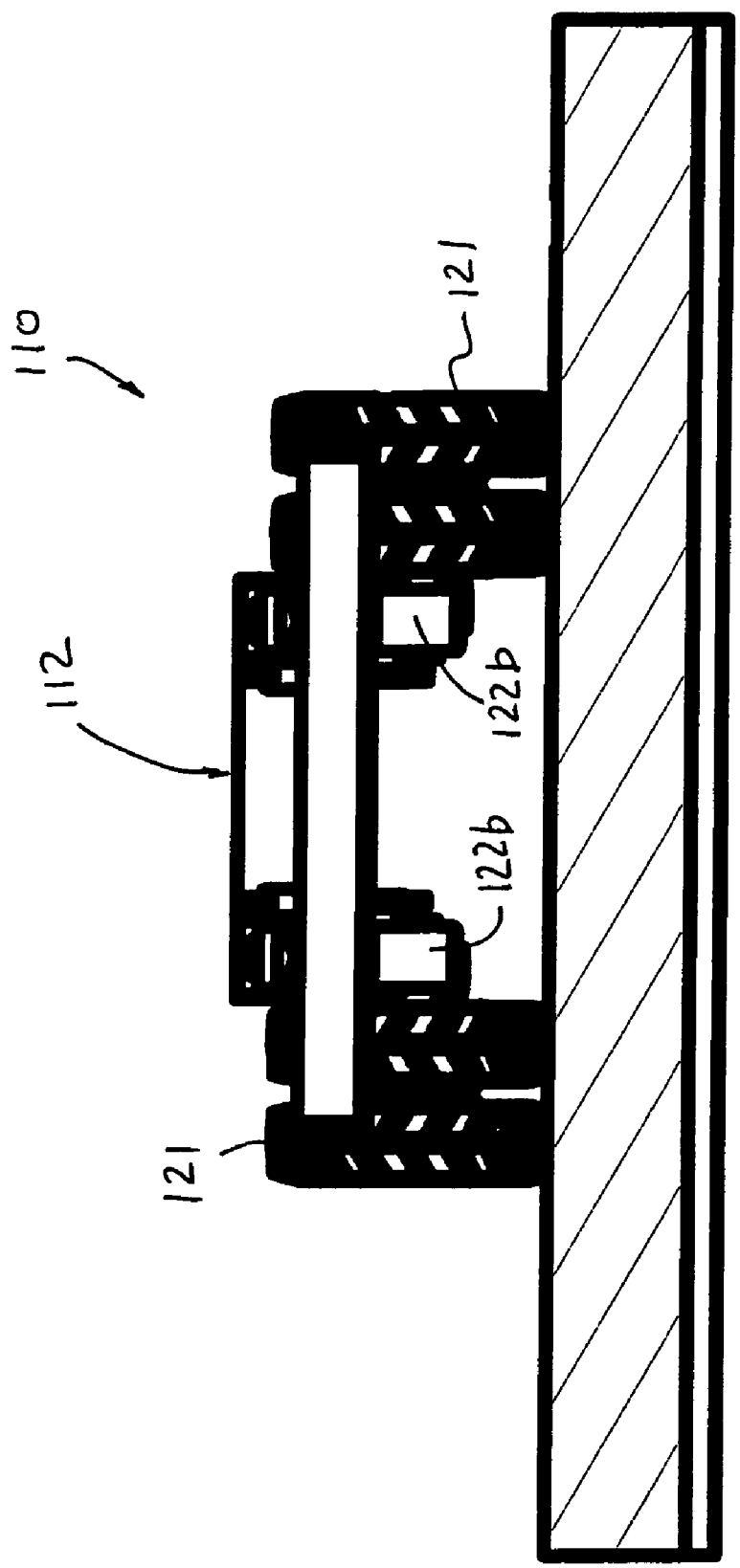
FIG. 24 is a rear end elevation of the cargo trailer of FIG. 23.
Figure 26:
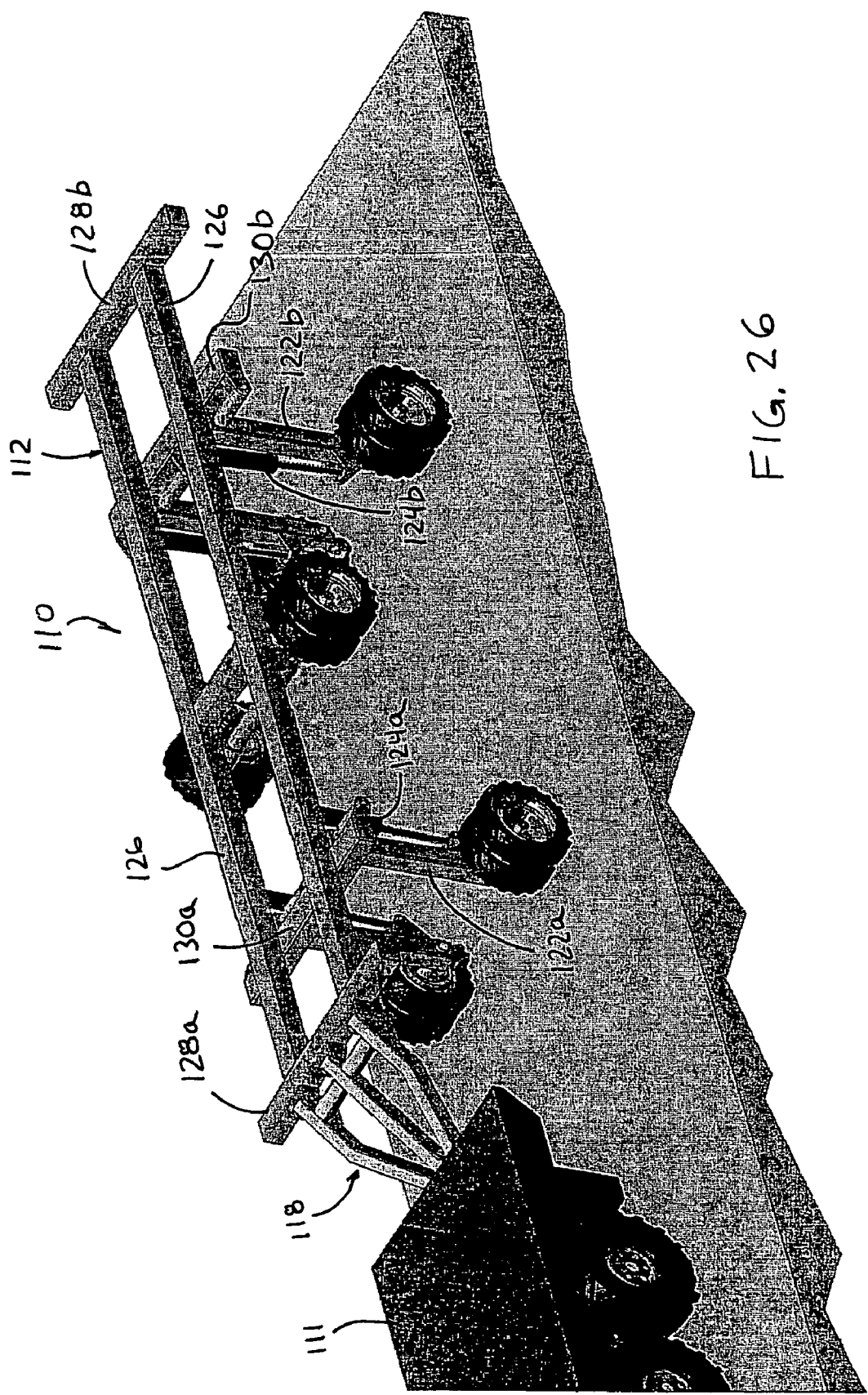
FIG. 26 is a perspective view of the cargo trailer of FIG. 25.
Figure 28:
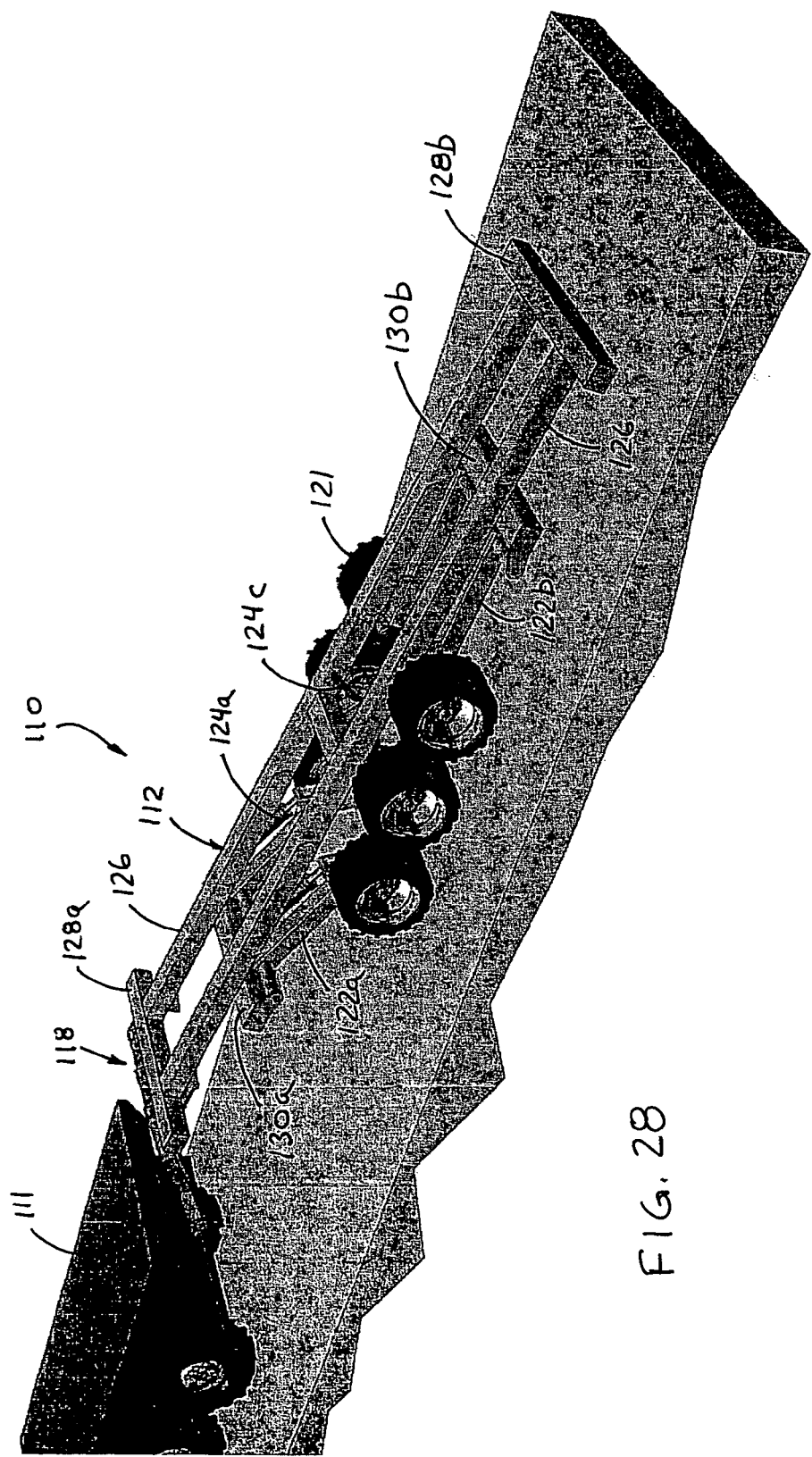
FIG. 28 is a perspective view of the cargo trailer of FIG. 27.

The control valves 60 and other controls and components of the cargo carrier 10 may be powered and controlled via an electrical system 70 (FIG. 21), which may include a control or controller 72 for controlling the various valves and devices. For example, controller 72 may control the control valves 60*a*, 60*b* of the lift actuators 24*a*-*c* in response to a level sensor or in response to a user input or the like so as to adjust the lift actuators to position the deck at the desired or appropriate configuration. The controller may also or otherwise control the operation of the engine or motor 58*a* to control its output. Optionally, the electrical system may include a tilt or level sensor 74 and safety relays to detect a degree of side-to-side tilt of the frame and/or deck and to limit such side-to-side tilting (such as by limiting or adjusting the degree of extension and retraction of the left side lift actuators relative to the right side lift actuators) to within a predetermined range (such as less than about three degrees toward either side), in order to limit sideways tilting that may cause articles to fall off of the deck or frame of the cargo carrier. The controller 72 may provide automatic control of some functions and may provide manual controls or inputs (such as control valve controls and a kill switch and the like) at a control panel or box at the cargo carrier for manual control of some or all of the functions of the cargo carrier. The directional control valves 60 may be positioned at an accessible area of the cargo carrier (such as at a side of the frame as in the illustrated embodiment) and the control valves may include manual switches or inputs for selective individual manual control of the control valves.

Optionally, the cargo carrier may include braking devices 52 at one or more of the wheels, and the controller may control the braking devices, such as in response to a manual input (such as for parking brake application) or in response to a signal from the tow vehicle or the like (such as for service brake application). In the illustrated embodiment, braking devices 52 are pneumatic braking devices at each wheel (but could be located at only some of the wheels while remaining within the spirit and scope of the present invention). For example, each braking device may comprise a can or housing with two chambers, with a diaphragm in each chamber and a large spring in one chamber. The spring applies the brake when its chamber has no air pressure in it, but when the spring chamber is pressurized with air (such as from the air tank), the brake releases to allow the trailer to move along the road or surface or ground. Such a system provides a parking brake or emergency brake for the cargo carrier, since the brakes are applied when the pressurized air is vented. The other chamber of the braking device applies the brake when pressurized with pressurized air (such as from the air tank 69). Such a system thus provides a service brake function for braking the wheels of the trailer as the trailer travels along the road or ground, such as in response to a braking signal from the tow vehicle.

Optionally, and desirably, the brakes may be operated from the air system or pneumatic system of the tow vehicle (such as via a connection to the pneumatic system of the tow vehicle at or near the forward end of the cargo carrier). However, there may be situations when the trailer is not connected to a tow vehicle, and in such situations, the on-board air compressor 69 and control valve 60h and electric switches or circuitry 76 may function to provide the pressurized air to the braking device (to release the spring brakes) and to release or vent the air as desired. For example, a manual switch or input may be provided to activate/deactivate the compressor and/or control valves to allow pressurized air to flow to the braking devices and/or to vent or dump the air from the braking devices and/or the air tank, or an electronic switch or control may perform similar functions in response to a signal or signals from the braking system of the tow vehicle.

As shown in FIGS. 1-4, actuators 22a, 22b may be partially extended and actuators 22c may also be partially extended (or fully extended, depending on the degree of movement of the center support arms 22c and the degree of pivotal movement of the forward and rearward support arms 22a, 22b) to set the wheels and tires of all three sets of support arms 22a, 22b, 22c at generally the same level, such as for traveling or moving along the support surface or road or ground. When at this level, the center of gravity COG (FIGS. 1 and 2A) of the unloaded cargo carrier 10 is generally at a center region of the frame 12. As shown in FIG. 1, the frame and deck height may be set so that the draw bar 18 is generally aligned with and connected to a towing portion of the vehicle 11, with the frame and deck being generally horizontally oriented for carrying cargo or articles thereon. As can be seen in FIG. 5, the actuators 24a, 24b, 24c may be fully retracted to lower the frame and deck to a lowest position, so as to provide a low profile or stealth orientation, such as for travel along a generally smooth road or non-rough terrain. When in this position, the center of gravity COG of the unloaded cargo carrier 10 is at a generally central upper region of the frame and deck.

Optionally, the frame and deck may be selectively raised, such as to generally align the deck with the height of the tow vehicle, such as can be seen in FIG. 6. As shown in FIG. 6, actuators 24a, 24b are extended to pivot support arms 22a, 22b downward to raise or elevate frame 12 and deck 14. When the support arms are pivoted to set the deck at the desired level, actuators 46a, 46b may be extended to pivot stabilizers 44a, 44b downward to engage the ground and thus stabilize the frame by supporting the frame at opposite ends thereof. When the cargo carrier is set with the deck generally aligned with the tow vehicle height, actuator 40 may be extended to move the deck 14 along the frame 12, such as from a rearward position (as shown in FIGS. 6 and 7) to a forward position (such as shown in FIGS. 8 and 9) to move a forward end of the deck adjacent to the rearward end of the vehicle, whereby articles may be readily transferred between the vehicle and the cargo carrier. As can be seen in FIG. 8, draw bar 18 may be shortened (such as either manually or via an actuator or the like) to draw the frame 12 and deck 14 closer to the tow vehicle 11 so that the forward end of deck 14 is at or adjacent to the rear of the vehicle when moved to its forward position.

Figure 12:
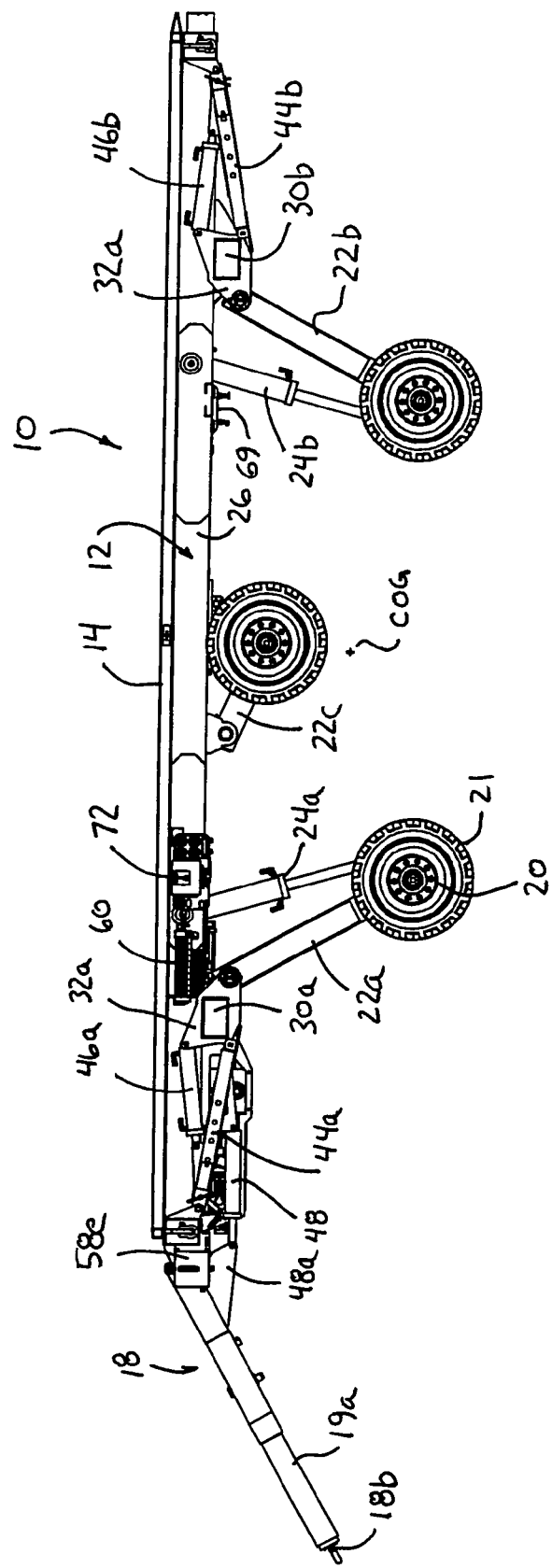
FIG. 12 is a side elevation of the cargo trailer in the raised position of FIG. 10, with the stabilizers raised.

In situations where it is desired to raise or elevate the deck further above the ground, such as for moving or transferring articles between the deck and an elevated location or platform, such as for loading and unloading an aircraft or the like, the actuators 24a, 24b may be further extended to further pivot support arms 22a, 22b to raise frame 12 and deck 14 to a raised or elevated position, as shown in FIG. 10. When elevated in this manner, stabilizers 44a, 44b may be pivoted downward and may be extended to an extended position so as to engage the ground to stabilize the frame 12 and deck 14 during the loading and unloading process. Optionally, and as shown in FIGS. 12 and 13, the frame 12 and deck 14 may be elevated, and the stabilizers 44a, 44b may be pivoted to their raised or non-use position so as to allow the cargo trailer 10 to be moved while in the raised or elevated orientation.

When it is desired to transfer articles between the deck 14 and the ground, such as to load or unload the cargo carrier, the frame 12 and deck 14 may be tilted rearward and downward so that a rearward end of the deck is moved toward the ground. As shown in FIGS. 14 and 15, rearward support arm 22b may be pivoted upward while forward support arm 22a may be pivoted downward so as to tilt the frame 12 and deck 14 so that the rearward end of the deck is tilted toward the ground. As can also be seen in FIGS. 14 and 15, deck 14 may be moved to a fully rearward position (via retraction of actuator 40) so that the rearward end of deck 14 engages the ground to position the deck as a ramp at the ground for ease of loading articles from the ground onto the deck and/or unloading articles from the deck to the ground. When the frame and deck are tilted and arranged in this manner, the forward stabilizer 44a may be lowered (via extension of actuator 46a) to engage the ground to stabilize the front of the cargo carrier as the carrier is loaded and/or unloaded.

In applications where the forward and rearward lift actuators on each side of the cargo carrier are controlled in parallel, the tilting of the frame and deck may be accomplished via retraction of actuators 48. For example, the lift actuators 24a, 24b along each side may comprise hydraulic cylinders that are in fluid communication with one another and that generally "float" relative to one another as described above. Pressurized fluid thus may be provided to the forward and rearward lift actuators or cylinders at each side of the cargo carrier via a common line such that the relative extension and retraction of the actuators is dependent on the resistance to such extension and retraction encountered by each of the actuators. Thus, the hydraulic control system 56 may control the lift actuators 24a, 24b to extend them to a desired degree of extension (such as, for example, to a partially extended state such as shown in FIGS. 1 and 4) and hold them at that state. When draw bar or tow bar actuators 48 are retracted, the draw bar 18 (which is attached to the vehicle) is pulled downward and toward the frame 12, which in turn raises the front of the frame upward and urges the rear of the frame downward. When such forces occur, the pressurized fluid in the rearward lift actuators 24b may flow from actuators 24b to the respective or same side forward lift actuators 24a to extend forward lift actuators 24a and correspondingly lower the forward support arms 22a to maintain the tires of forward support arms 22a in engagement with the ground.

Optionally, the actuators may be independently controlled to cause the desired pivoting or tilting of the trailer while remaining within the spirit and scope of the present invention. The tilting of the frame and deck thus may be accomplished via selective control of lift actuators 24a, 24b (such as by extending forward lift actuators 24a while retracting rearward lift actuators 24b). Such an independent control system may also allow the cargo carrier to "walk" over uneven terrain, such as discussed below with respect to cargo carrier 310 of FIG. 33.

Thus, cargo carrier 10 includes wheels and tires that are independently rotatably mounted to respective support arms which, in turn, are pivotally mounted to the frame of the carrier. The cargo carrier thus has enhanced ground clearance since there is no axle extending between the wheels and has enhanced adaptability to different terrain and for different applications. Pivotal movement of the support arms functions to raise and lower the frame and the deck and/or to pivot or tilt the frame and the deck, depending on the desired configuration of the cargo carrier.

Optionally, and with reference to FIGS. 22-28, a cargo carrier or trailer 110 may include a frame 112, a support system 116, and a draw bar or tow bar 118. Cargo carrier 110 may be substantially similar to cargo carrier 10, discussed above, but does not include an adjustable or movable deck on frame 112, and thus a detailed discussion of the cargo carriers need not be repeated herein. The components or elements of cargo carrier 110 that may be similar or common with cargo carrier 10 are shown in FIGS. 22-28 with similar reference numbers as those used in FIGS. 1-21 in connection with cargo carrier 10, but with 100 added to each of the reference numbers.

Optionally, and with reference to FIGS. 29-32, a fifth-wheel type cargo carrier 210 may attach to a vehicle and may include a frame 212, a support system 216 and a draw bar or tow bar 218. Cargo carrier 210 may be substantially similar to cargo carrier 10, discussed above, but draw bar 218 includes linkages 218a, 218b, which are adjustable (via extension and retraction of actuators 248a, 248b) relative to one another and relative to frame 212 to adjust the attachment point or level of the draw bar 218 relative to frame 212. Because cargo carrier 210 may be substantially similar to cargo carrier 10, a detailed discussion of the cargo carriers need not be repeated herein. The components or elements of cargo carrier 210 that may be similar or common with cargo carrier 10 are shown in FIGS. 29-32 with similar reference numbers as those used in FIGS. 1-21 in connection with cargo carrier 10, but with 200 added to each of the reference numbers.

Draw bar 218 may be raised by extending one or both of actuators 248a, 248b, and may be lowered by extending one or both of actuators 248a, 248b. The multiple linkages 218a, 218b allow the frame and deck of cargo carrier 210 to be substantially level or horizontally oriented at one height, while the outermost or forwardmost draw bar linkage 218a is also substantially level or horizontally oriented at another height (such as a higher or lower height), with the intermediate linkage 218b at an angle between a mounting portion 212a of frame 212 and the forwardmost linkage 218a. Such an arrangement allows the trailer or carrier to attach to a fifth-wheel type attachment even if the attachment (where the forwardmost linkage 218a should be level or parallel to the connecting portion of the vehicle 211) is at a level above level of the frame 212 (as shown in FIGS. 29 and 31).

Optionally, and as shown in FIG. 29, center support arms 222c of support system 216 may be about the same length as the forward support arms 222a and rearward support arms 222b, such that when the support arms 222a, 222b, 222c are pivoted downward, all six tires 221 may engage the ground to support the frame 212 and deck 214 at the desired height. Optionally, a belt or track 254 may be positioned around the tires 221, such as in a similar manner as described above. Optionally, a rear end of frame 212 may include a roller 212b, which may ease loading and unloading of articles onto and off from the deck 214.

Figure 33:
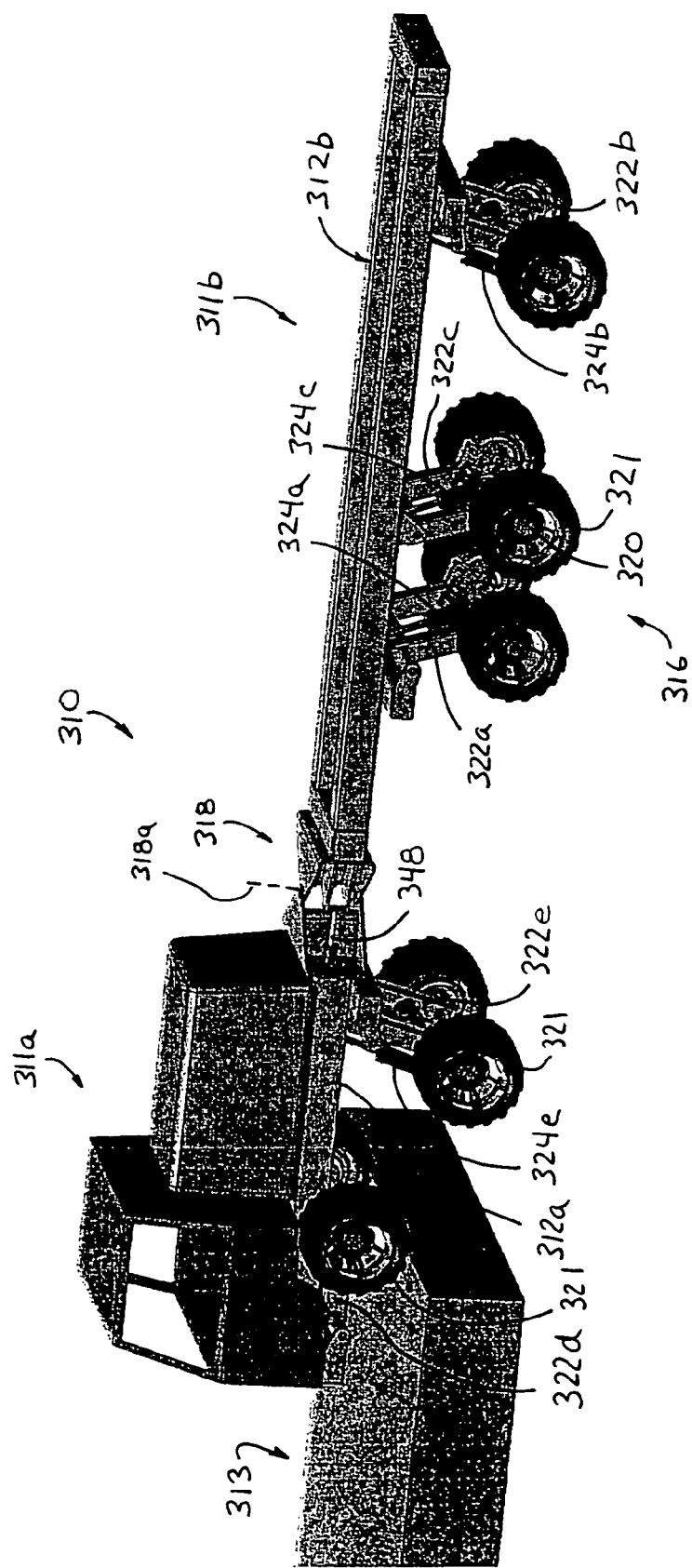
FIG. 33 is a perspective view of a cargo carrier or vehicle of the present invention, where the wheels are selectively adjusted relative to the frame and deck via a "walking" function of the vehicle, in order to accommodate substantial changes in terrain.

Optionally, and with reference to FIG. 33, a cargo carrier or articulated carrier or vehicle 310 includes a tow vehicle or truck 311a and a cargo trailer 311b pivotally attached to a rear of tow vehicle 311a via an articulatable connector 318. Articulation of connector 318 is accomplished via an actuator 348, such as a hydraulic cylinder or the like, which extends and retracts to cause pivotal movement of the trailer or tow vehicle relative to the other and about a generally vertical pivot axis 318a.

Both vehicle 311a and trailer 311b include a support system 316, such as a support system similar to those described above. For example, trailer 311b may include three support arms 322a-c and associated actuators 324a-c and wheels 320 and tires 321 on each side of a frame 312b of the trailer 311b, such as in a similar manner as described above, while vehicle 311a also includes forward support arms 322d and forward actuators (not shown) and rearward support arms 322e and rearward actuators 324e (and associated wheels 320 and tires 321) attached to a frame 312a of vehicle 311a. The support arms and actuators of support system 316 may operate in a similar manner as the support arms and actuators of support system 16 discussed above.

Although shown as having a frame 312b but no deck thereon, the cargo carrier 310 may include a deck (such as a deck similar to those described above) that is movably or fixedly mounted on frame 312b without affecting the scope of the present invention. Although shown with center arms 322c being about the same length as forward arms 322a and rearward arms 322b of trailer 311b, clearly the center support arms of trailer 311b may be similar to support arms 22c of support system 16 discussed above.

As can be seen in FIG. 33, as cargo carrier 310 approaches a large obstacle or ledge or platform 313, the forward support arms 322d may be raised upward so that the tires 321 of forward support arms 322d may be generally at or near the height of the obstacle or platform. Thus, as the carrier is moved forward toward the obstacle or platform, the front tires 321 roll onto the raised surface of the obstacle or platform to support the front end of vehicle 311a at the obstacle or platform. Once the front end of the vehicle 311a is supported, the rear support arms 322e may be raised to move the tires 321 at the rear support arms 322e upward for general alignment with the upper surface of the obstacle or platform so as to roll onto the obstacle or platform as the carrier continues to move forward. The support arms 322a-c of trailer 311b may be raised in a similar manner as they approach the obstacle or platform until all of the tires are at or on or above the obstacle or platform and the carrier is fully supported at the raised obstacle or platform. The independent control of the actuators to achieve the "walking" function may be in response to sensors (such as proximity sensors or the like) at the cargo carrier that detect the obstacle or platform, whereby a signal from the sensors may automatically trigger (such as via a controller or the like) the corresponding retraction of the appropriate actuators to raise the tires to the appropriate level, or the controller may control the actuators in response to manual inputs to allow for manual adjustment of the support arms to achieve the desired function.

The cargo carrier 310 thus can "walk" onto raised surfaces or ledges, without requiring a ramp or the like to drive up and onto the surface. Although shown as including a tow vehicle with such a walk over feature, the support system of the present invention may be implemented on a trailer (such as those described above) and may be adjusted as the trailer is moved toward a large obstacle or raised platform or the like to provide a similar walk-over feature for the trailer. The trailer may be towed over the obstacle or platform or may be manually moved or self-driven (such as via a motor driving one or more of the wheels of the trailer) to and over and/or onto the obstacle or platform.

Thus, the present invention provides a cargo trailer or vehicle for carrying cargo and for loading and unloading the cargo at different elevations or heights. The frame may be supported above the ground via a plurality of tires on wheels, which are rotatably mounted to supports that extend from the frame. The cargo trailer may receive or support cargo on the deck and may pivot or tilt downwardly to the ground to load the cargo onto the deck, such as shown in FIGS. 14, 15, 27 and 28. The deck and frame may also be raised upwardly above the wheels/tires and support surface or ground (as shown in FIGS. 6-13, 25, 26 and 29-32), such as for generally aligning the deck with an unloading portion of a targeted vehicle or the like, such as a cargo bay or the like, or to assist in "walking" the vehicle or trailer over uneven terrain (FIG. 33).

The tires and wheels are mounted at the lower ends of supports or legs that are pivotally or adjustably and/or extendable/retractable to adjust a level of the deck relative to the ground. Each wheel is mounted to a respective support, with no axle extending between wheels at opposite sides of the trailer or vehicle. Aspects of the cargo carrier (such as a trailer or fifth-wheel type trailer or vehicle or truck or the like) may be similar to that of the cargo trailer of the type described in U.S. patent application Ser. No. 10/796,619, filed Mar. 9, 2004 by Quenzi et al. for CARGO TRAILER, U.S. Pat. Pub. No. US 2005/0226707 A1, published Oct. 13, 2005, now U.S. Pat. No. 7,134,829, which is hereby incorporated herein by reference in its entirety.

The trailer and truck concepts of the present invention may be suitable for military requirements such as the FITS and SLOT trailers (Self-Loading/Off-Loading Trailers) and the like. Such requirements may include a low deck height capability for aircraft loading and a desire for rough terrain operation. The cargo carrier of the present invention has a support or suspension system, such as a hydro lift suspension system. This system may be used in various types of vehicles or trailers, such as in one of the three trailer/vehicle configurations discussed herein, namely, a tow behind trailer (FIGS. 1-18 and 22-28), a fifth wheel type trailer (FIGS. 29-32) similar to that required by SLOT, and an articulated vehicle or truck (FIG. 33). Other configurations may be implemented while remaining within the spirit and scope of the present invention.

The suspension is adaptable for quick field installation of rubber belted tracks (FIGS. 18, 31 and 32) without any tools or lifts required. This may provide improved off road capability to a unit with relatively small tires. The forward and rearward wheels may be moved closer to one another to allow for installation of the belted tracks or treads around the wheels and then the wheels may be moved further apart and/or the center wheel may be moved to set or adjust the tension in the belt to the desired or appropriate amount so that the belt remains on and around the wheels and tires during operation of the vehicle or trailer.

Another feature of the present invention that also enhances off road operation is the ability of a truck or trailer utilizing the suspension to "walk" over obstacles equal to the deck lift travel (as shown in FIG. 33). In other words if the truck or trailer is designed to have a five foot deck lift height travel (or other height), it would be able to negotiate off road obstacles five feet high regardless of the size of the tires. This capability is shown in FIG. 33, where a vehicle or trailer with 36 inch tires can walk over a vertical wall five feet high. In such a "walk over" mode, the supports are cooperatively adjusted relative to the frame to adjust one or more of the supports and respective wheels/tires to adapt to a different level of terrain at the support surface or ground. As shown in FIG. 33, the front wheels/tires are raised to be positioned over the raised support surface, while the rearward sets of wheels/tires are at the lower support surface. As the vehicle is moved forward, each pair of wheels/tires and supports will be similarly adjusted or pivoted to be positioned over the raised support surface. Such a feature may be very useful and suitable for military and other rough terrain and off-road applications. Although shown as a vehicle with such a walk over feature, the support system of a trailer may be adjusted in accordance with the present invention to provide a similar feature for a trailer, where the trailer may be towed over the obstacle or may be manually moved or self-driven over the obstacle.

The trailer or vehicle of the present invention also provides the ability of the vehicle to operate in a lowered "stealth" mode (FIGS. 5 and 22), or raised to a fully raised position (such as the fully raised height shown in FIGS. 25 and 26) or any intermediate height (such as the heights shown in FIGS. 1-4, 6-13, 23 and 29-32 or any other height between the lowered position and the fully raised position) for rough terrain operation or better visibility or to load/unload cargo at loading docks or high aircraft decks or the like. The vehicle also has the ability to load/unload at the ground level by tilting the back of the deck down to ground level (such as shown in FIGS. 14, 15, 27 and 28). Optionally, the deck may be movably mounted to the frame portion and movable forwardly or rearwardly to accommodate different cargo loading/unloading and/or carrying situations.

The suspensions may comprise a hydro-pneumatic type similar to that used on large off highway haulers, with the suspension struts or supports or legs doubling as the lifting mechanism for the deck and frame portion. This double function capability results in mechanically simple units with very favorable payload to empty weight ratios. Optionally, struts may be mounted above the suspension arms and recessed within the frame rails when in the travel position, such that the vehicle of the present invention is very rugged from a standpoint of external damage. Suspension height can be varied while the vehicle is traveling along the support surface or road via extension and retraction of the selected or appropriate actuators (such as hydraulic cylinders or other linear actuators or the like) to pivot or adjust the respective supports to position the deck at the desired or appropriate height above the ground or support surface. Optionally, the suspension may be locked at a desired or selected orientation to provide enhanced stability of the vehicle when desired.

The suspension can be used in a passive mode and may be adaptable to active suspension control with feedback from sensors, as well as having manual overrides. The vehicle of the present invention may also have enhanced "limp home" ability in that any damaged units (such as damaged wheels/tires/supports) can be isolated (such as by raising them to the fully raised position at and immediately beneath the frame and deck) and allowed to go along for the ride while the other wheels/tires/supports support the deck and frame above the support surface as the vehicle travels over the support surface or road. If all suspension ability were compromised, mobility would not be lost, since the unit could still travel or ride at its minimum height (or at any other height at which the deck and frame portion may be mechanically locked). Because there is no axle extending between corresponding tires/wheels at opposite sides of the vehicle, ground clearance is enhanced even with relatively small tires, and is competitive with many military tow vehicles with much larger tires. All these features allow the trailer or vehicle of the present invention to readily acclimate to rough terrain as well as highway use.

The articulated truck shown in FIG. 33, though with relatively small tires to facilitate C-130 loading, would compare very favorably to the military HEMTT vehicle in terms of off road ability, turning circle, ground clearance and deck size. The truck drive means can be by individual hydraulic motors at each wheel operated by any drive means, such as a hydrostatic transmission or by AC or DC electric motors and hybrid diesel electric drives or fuel cells or the like. With numerous identical or common suspension/drive components, parts stocking and servicing may be simplified.

Therefore, the present invention provides a cargo carrier or trailer or vehicle with wheels and tires independently mounted to movable or adjustable supports that are adjustable or pivotable relative to the frame to adjust the height or orientation of the deck or frame, such as for loading or unloading of articles and/or for traveling along a support surface, such as a road or uneven terrain. The cargo carrier has a frame for supporting articles thereon with the frame being raisable and lowerable and tiltable relative to the wheels and tires and support surface or ground via pivotal movement of the support arms. The cargo carrier thus may be readily adjusted via pivotal movement of the support arms to set the frame (and a deck mounted thereon) at a desired height or tilt angle to ease loading and unloading of the cargo carrier. The wheels and tires are rotatably mounted to the separate respective support arms such that corresponding wheels on opposite sides of the cargo carrier do not have an axle extending therebetween. The support arms and associated actuators function to adjust the height and tilt angle of the frame and also function as a suspension system for the cargo carrier.

Changes and modifications to the specifically described embodiments may be carried out without departing from the principles of the present invention, which is intended to be limited only by the scope of the appended claims, as interpreted according to the principles of patent law.

The embodiments of the invention in which an exclusive property or privilege is claimed are defined as follows:

1. A cargo carrier for movably supporting cargo, said cargo carrier comprising:
   a frame configured to support cargo at said cargo carrier;
   at least three wheels at each side of said frame, each of said wheels being rotatably mounted to a respective support arm, said wheels being independently mounted to the respective support arms with no common axle extending across said frame and associated with corresponding wheels at opposite sides of said cargo carrier; and
   said support arms being pivotally mounted at respective sides of said frame and being independently pivotable relative to said frame to adjust both the height and tilt of said frame relative to a support surface, said cargo carrier being readily adapted to position said frame at (a) a plurality of lower travel positions in which each of said at least three wheels at each side of said frame supports at least a portion of said frame on the support surface as the cargo carrier travels along the support surface and (b) a plurality raised travel positions in which at least one of said wheels at each side of said frame is raised above the support surface relative to the others of said wheels as the cargo carrier travels along the support surface.

2. The cargo carrier of claim 1, wherein said cargo carrier comprises one of a tow behind trailer, a fifth-wheel type trailer, a driven vehicle and an articulated driven vehicle.

3. The cargo carrier of claim 1, wherein said frame has a deck mounted at an upper surface of said frame, said deck being configured to support cargo at said cargo carrier.

4. The cargo carrier of claim 3, wherein said deck is movably mounted at said upper surface of said frame, said deck being longitudinally movable along said frame between a forward position and a rearward position.

5. The cargo carrier of claim 1, wherein a pair of forward support arms are angled rearward and a pair of rearward support arms are angled forward, said forward arms and said rearward arms being pivotable to adjust a height of said frame.

6. The cargo carrier of claim 1, wherein said support arms are cooperatively adjusted to work together to adjust the height and tilt of the frame so that said cargo carrier is operable to adapt a respective set of support arms and wheels for a different level of the support surface relative to the other support arms and wheels.

7. The cargo carrier of claim 6, wherein said support arms on one side of said cargo vehicle are cooperatively adjusted to work together while said support arms on the other side of said cargo carrier are cooperatively adjusted to work together.

8. The cargo carrier of claim 1, wherein said support arms are pivoted in response to extension and retraction of a respective actuator.

9. The cargo carrier of claim 1, wherein said support arms at each side of said cargo carrier are adjusted to position said respective wheels at a selected orientation relative to said frame and relative to one another, whereby a continuous track is positionable around said wheels when said wheels are at said selected orientation.

10. The cargo carrier of claim 1, wherein at least one of said wheels is rotatably driven to move said cargo carrier along the support surface.

11. A cargo carrier for movably supporting cargo, said cargo carrier comprising:
   a frame;
   a deck movably mounted to said frame and longitudinally movable along said frame, said deck being configured to support cargo at said cargo carrier; and
   a support system for movably supporting said frame and said deck above a support surface, said support system including a pair of forward support arms pivotally mounted to respective sides of said frame, a pair of center support arms pivotally mounted with respect to respective sides of said frame, and a pair of rearward support arms pivotally mounted to respective sides of said frame;
   each of said forward and rearward support arms and said center support arms extending from said frame and having a respective wheel rotatably mounted at an end thereof, said forward support arms being pivotable relative to said frame to adjust a height of a forward portion of said frame relative to the support surface, said rearward support arms being pivotable relative to said frame to adjust a height of a rearward portion of said frame relative to the support surface, and said forward and rearward support arms being pivotable to raise the height of said frame so as to raise the wheels associated with said center support arms above the support surface; and
   wherein said forward and rearward support arms are configured to position said frame at a plurality of first ride heights in which the wheels associated with said forward and rearward su ort arms support the frame at the support surface as said cargo carrier travels along the support surface and in which the wheels associated with said center support arms are raised relative to said wheels associated with said forward and rearward support arms, and wherein said forward and rearward and center support arms are configured to position said frame at a plurality of second ride heights in which the wheels associated with said forward and rearward and center support arms all support the frame at the support surface as said cargo carrier travels along the support surface.

12. The cargo carrier of claim 11, wherein said cargo carrier comprises one of a tow behind trailer, a fifth-wheel type trailer, a driven vehicle and an articulated driven vehicle.

13. The cargo carrier of claim 11, wherein said forward and rearward support arms at each side of said cargo carrier are cooperatively adjusted to work together to adjust the height of the frame.

14. The cargo carrier of claim 13, wherein said cargo carrier is operable to adapt said forward and rearward support arms and wheels at one side of said cargo carrier for a different level of the support surface relative to said forward and rearward support arms and wheels at the other side of said cargo carrier.

15. The cargo carrier of claim 11, wherein said support arms are pivoted in response to extension and retraction of a respective actuator.

16. The cargo carrier of claim 15, wherein said actuators comprise hydraulic cylinders of a hydraulic control system.

17. The cargo carrier of claim 16, wherein said hydraulic cylinders at least partially absorb the impact of said wheels against objects as said cargo carrier is moved along the support surface.

18. The cargo carrier of claim 16, wherein said hydraulic cylinders of said forward and rearward support arms at one side of said frame are cooperatively controlled to work together and said hydraulic cylinders of said forward and rearward support arms at the other side of said frame are cooperatively controlled to work together.

19. The cargo carrier of claim 18, wherein said hydraulic control system is configured to allow fluid from said actuator of said rearward support arm to flow to said actuator of said forward support arm to tilt said frame and said deck rearward and downward in response to a lifting force at a forward end of said frame.

20. The cargo carrier of claim 19, wherein said cargo carrier comprises a trailer, said cargo carrier including a draw bar pivotally attached at said forward end of said frame and being pivotable via an actuator, said draw bar being connectable to a towing vehicle to tow said cargo carrier, wherein pivotal movement of said draw bar when said draw bar is connected to a vehicle imparts said lifting force at said forward end of said frame.

21. The cargo carrier of claim 11, wherein said cargo carrier comprises a trailer, said cargo carrier including a draw bar pivotally attached at a forward end of said frame and being pivotable via an actuator, said draw bar being connectable to a towing vehicle to tow said cargo carrier, wherein pivotal movement of said draw bar via said actuator when said draw bar is connected to a vehicle imparts a lifting force at said forward end of said frame to tilt said frame rearward and downward.

22. The cargo carrier of claim 11 including at least one stabilizer at each end portion of said frame, said at least one stabilizer being lowerable to engage the support surface to stabilize the respective end portion of said frame when said cargo carrier is being loaded or unloaded.

23. The cargo carrier of claim 11, wherein said wheels are independently mounted to the respective supports with no common axle extending between corresponding wheels at opposite sides of said cargo carrier.

\* \* \* \* \*

UNITED STATES PATENT AND TRADEMARK OFFICE
CERTIFICATE OF CORRECTION

| | | |
|---|---|---|
| PATENT NO. | : 7,950,675 B1 | Page 1 of 1 |
| APPLICATION NO. | : 11/432851 | |
| DATED | : May 31, 2011 | |
| INVENTOR(S) | : Philip J. Quenzi and Richard W. Jenney | |

It is certified that error appears in the above-identified patent and that said Letters Patent is hereby corrected as shown below:

<u>Column 15</u>
Line 19, "FITS" should be --FTTS--

<u>Column 17</u>
Line 45, Claim 1, Insert --of-- after "plurality"

<u>Column 18</u>
Line 49, Claim 11, "su ort" should be --support--

Signed and Sealed this
Tenth Day of April, 2012

David J. Kappos
*Director of the United States Patent and Trademark Office*